(12) United States Patent
Corten et al.

(10) Patent No.: US 10,160,871 B2
(45) Date of Patent: *Dec. 25, 2018

(54) AQUEOUS COATING COMPOSITION FOR APPLYING A BASECOAT FILM, COMPRISING A MIXTURE OF A POLYESTER AND A POLYAMIDE WITH LOW ACID NUMBER AS RHEOLOGICAL ASSISTANT

(71) Applicant: BASF Coatings GmbH, Muenster (DE)

(72) Inventors: Cathrin Corten, Shanghai (CN); Dirk Eierhoff, Muenster (DE); Patrick Wilm, Ahlen (DE); Joerg Schwarz, Muenster (DE); Susanne Katharina Fechtner, Muenster (DE)

(73) Assignee: BASF Coatings GmbH, Muenster (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/505,449

(22) PCT Filed: Aug. 21, 2015

(86) PCT No.: PCT/EP2015/069261
§ 371 (c)(1),
(2) Date: Feb. 21, 2017

(87) PCT Pub. No.: WO2016/026965
PCT Pub. Date: Feb. 25, 2016

(65) Prior Publication Data
US 2017/0267875 A1    Sep. 21, 2017

(30) Foreign Application Priority Data

Aug. 22, 2014  (EP) .................... 14182024

(51) Int. Cl.
| C09D 167/08 | (2006.01) |
| C09D 177/00 | (2006.01) |
| C09D 7/44 | (2018.01) |
| C09D 5/03 | (2006.01) |
| C09D 7/65 | (2018.01) |
| C09D 7/20 | (2018.01) |
| C09D 133/10 | (2006.01) |
| C09D 167/00 | (2006.01) |
| C09D 175/04 | (2006.01) |
| C08L 77/00 | (2006.01) |
| C08L 67/00 | (2006.01) |

(52) U.S. Cl.
CPC .............. *C09D 7/44* (2018.01); *C09D 5/037* (2013.01); *C09D 7/20* (2018.01); *C09D 7/65* (2018.01); *C09D 133/10* (2013.01); *C09D 167/00* (2013.01); *C09D 167/08* (2013.01); *C09D 175/04* (2013.01); *C09D 177/00* (2013.01); *C08L 67/00* (2013.01); *C08L 77/00* (2013.01); *C08L 2201/00* (2013.01)

(58) Field of Classification Search
None
See application file for complete search history.

(56) References Cited

U.S. PATENT DOCUMENTS

| 2,793,219 A | 5/1957 | Barrett et al. |
| 2,955,121 A | 10/1960 | Myers et al. |
| 5,025,043 A | 6/1991 | Smith |
| 2011/0042623 A1* | 2/2011 | Luer ............... C08G 69/34 252/500 |
| 2017/0267876 A1* | 9/2017 | Corten ............... C09D 7/004 |

FOREIGN PATENT DOCUMENTS

| DE | 25 06 211 A1 | 8/1975 | |
| DE | 40 09 858 A1 | 10/1991 | |
| DE | 40 28 386 A1 | 3/1992 | |
| DE | 4028386 A1 * | 3/1992 | ............... C09D 7/02 |
| DE | 44 37 535 A1 | 4/1996 | |
| DE | 44 38 504 A1 | 5/1996 | |
| DE | 199 48 004 A1 | 7/2001 | |
| EP | 0 228 003 A1 | 7/1987 | |
| EP | 0 228 003 B2 | 7/1987 | |
| EP | 0 562 329 A1 | 9/1993 | |
| EP | 0 593 454 B1 | 5/1997 | |
| EP | 0 877 063 A2 | 11/1998 | |

(Continued)

OTHER PUBLICATIONS

International Search Report dated Oct. 30, 2015 in PCT/EP2015/069261 filed Aug. 21, 2015.

*Primary Examiner* — Richard A Huhn

(74) *Attorney, Agent, or Firm* — Oblon, McClelland, Maier & Neustadt, L.L.P.

(57) ABSTRACT

The present invention relates to an aqueous coating composition comprising at least one mixture (M) of at least one polymeric resin (P1) and at least one polymeric resin (P2), different therefrom, where (P1) is a polyamide and (P2) is a polyester which is at least obtainable by reaction of at least one polymerized aliphatic $C_{12}$-$C_{24}$-monocarboxylic acid with at least one diol and/or polyol, at least one binder (A) comprising at least one polymeric resin (A1), which is different from the polymeric resins (P1) and (P2), at least one pigment (B), where the polyamide used as polymeric resin (P1) has an acid number <10 mg of KOH per g of polyamide and the mixture (M) is obtainable by dispersing of the polymeric resin (P1) in water or an aqueous medium in the presence of the polymeric resin (P2), to a method for at least partly coating a substrate with a basecoat film by means of the aqueous coating composition, and to a use of the mixture (M) as a rheological assistant in aqueous coating compositions.

16 Claims, No Drawings

(56) References Cited

FOREIGN PATENT DOCUMENTS

| | | |
|---|---|---|
| EP | 0 787 159 B1 | 12/1998 |
| EP | 1 153 989 A1 | 11/2001 |
| EP | 2 457 961 A1 | 5/2012 |
| WO | 91/15528 A1 | 10/1991 |
| WO | 92/15405 A1 | 9/1992 |
| WO | 2005/021168 A1 | 3/2005 |
| WO | 2009/100938 A1 | 8/2009 |

* cited by examiner

AQUEOUS COATING COMPOSITION FOR APPLYING A BASECOAT FILM, COMPRISING A MIXTURE OF A POLYESTER AND A POLYAMIDE WITH LOW ACID NUMBER AS RHEOLOGICAL ASSISTANT

The present invention relates to an aqueous coating composition comprising at least one mixture (M) of at least one polymeric resin (P1) and at least one polymeric resin (P2), different therefrom, where (P1) is a polyamide and (P2) is a polyester which is at least obtainable by reaction of at least one polymerized aliphatic $C_{12}$-$C_{24}$ monocarboxylic acid with at least one diol and/or polyol, at least one binder (A) comprising at least one polymeric resin (A1), which is different from the polymeric resins (P1) and (P2), at least one pigment (B), where the polyamide used as polymeric resin (P1) has an acid number <10 mg of KOH per g of polyamide and the mixture (M) is obtainable by dispersing of the polymeric resin (P1) in water or an aqueous medium in the presence of the polymeric resin (P2), to a method for at least partly coating a substrate with a basecoat film by means of the aqueous coating composition, and to a use of the mixture (M) as a rheological assistant in aqueous coating compositions.

A known approach particularly in the case of automotive finishing, but also in other areas where coatings combining effective decoration with effective protection from corrosion are desired, is to give substrates a plurality of coating films disposed one above another. Multicoat paint systems are in this case applied preferably by what is called the "basecoat/clearcoat" method; i.e., a pigmented basecoat material is applied first and is given an overlying coating of a clearcoat material after a brief flashing time without a baking step (wet-on-wet method). Subsequently, basecoat and clearcoat materials are baked jointly. The "basecoat/clearcoat" method has acquired particular importance in connection with the application of automotive metallic effect paints.

For reasons of economics and environment there is a demand to use aqueous coating compositions when applying such multicoat paint systems, particularly when applying the basecoat film.

The coating compositions for producing these basecoat films ought to be able to be processed by the aforementioned "wet-on-wet" method, i.e., they ought to be able to be given an overlying clearcoat film after a very short initial drying period without a baking step, without this procedure being accompanied by defects to the visual appearance, such as, for example, what are called pinholes, pops, bits and/or flow defects. In order at least to minimize such defects, it is usual, among other things, to use suitable rheological assistants in the coating compositions to be applied.

With metallic effect paints of the basecoat/clearcoat type, moreover, there are other requirements that ought to be met. The metallic effect depends crucially on the orientation of the metal pigment particles in the coating film. A metallic effect basecoat material for processing by the "wet-on-wet" method must therefore yield coating films in which the metal pigments, after application, are present in a favorable spatial orientation and in which this orientation is rapidly fixed in such a way that it cannot be disrupted in the course of the ongoing painting operation. Suitable parameters for characterizing the metallic effect are the lightness of the hue, the flop index, and the assessment of cloudiness in the resulting finish.

Known from EP 0 877 063 A2 are aqueous coating compositions which comprise a polyamide which is normally used in aqueous compositions and which is notable, on the basis of its intended use in aqueous systems, for a comparatively high acid number of typically ≥30. Aqueous coating compositions which include such polyamides with comparatively high acid number, normally used in aqueous compositions, are also known, furthermore, from WO 2009/100938 A1 and EP 2 457 961 A1. A disadvantage of the presence of such a polyamide as a rheological assistant in aqueous coating compositions, however, is in particular the occurrence of bits in the case of processing by means of the "wet-on-wet" method and/or on incorporation of the polyamide into the coating compositions, and/or an inadequate storage stability (unmixing or phase separation) for such coating compositions, especially at relatively high temperatures such as temperatures ≥40° C., for example.

DE 40 28 386 A1 as well discloses aqueous coating compositions which include a polyamide as sole rheological assistant.

EP 1 153 989 A1 discloses aqueous coating compositions which include a polyamide typically used in aqueous coating compositions and having an acid number ≥30, such as the commercially available product Disparlon® AQ-600, for example, and which further comprise, as an additional rheological assistant, a metal silicate, such as the commercially available metal silicate Laponite® RD, for example. A disadvantageous feature of the presence of such a metal silicate, especially in combination with a polyamide commonly used in aqueous compositions and having an acid number >30, in aqueous coating compositions may often be, however, the occurrence of pinholes and/or pops in the case of processing by the "wet-on-wet" method. Using such metal silicates as sole rheological assistant, however, has disadvantages in relation, among other things, to the occurrence of runs and pops.

The use of polyamides having relatively low acid numbers per se as rheological assistants is known in principle, although such polyamides can be used exclusively in solvent-based coating compositions. The use of such solvent-based coating compositions with high fractions of organic solvents is undesirable, however, for environmental reasons.

There is therefore a need for aqueous coating compositions, especially basecoat compositions, which do not have the disadvantages mentioned above.

It is an object of the present invention, therefore, to provide an aqueous coating composition, more particularly an aqueous basecoat composition, which has advantages over the coating compositions known from the prior art. A particular object of the present invention is to provide an aqueous coating composition, more particularly an aqueous basecoat composition, which is distinguished by advantageous application properties but with which at the same time there is to be no adverse effect on the metallic effect the coating composition is intended to achieve.

This object is achieved by the subject matter claimed in the claims, and also by the preferred embodiments of this subject matter that are described in the description hereinafter.

A first subject of the present invention is therefore an aqueous coating composition comprising at least one mixture (M) of at least one polymeric resin (P1) and at least one polymeric resin (P2), different therefrom, where the polymeric resin (P1) is a polyamide and the polymeric resin (P2) is a polyester which is at least obtainable by reaction of at least one polymerized aliphatic $C_{12}$-$C_{24}$ monocarboxylic acid with at least one diol and/or polyol, at least one binder (A) comprising at least one polymeric resin (A1), which is different from the polymeric resins (P1) and (P2), and optionally at least one crosslinking agent (A2), and at least one pigment (B)

for at least partly coating an optionally coated substrate with a basecoat film, wherein the polyamide used as polymeric resin (P1) has an acid number <10 mg of KOH per g of polyamide and the mixture (M) is obtainable by dispersing of the polymeric resin (P1) in water or an aqueous medium in the presence of the polymeric resin (P2).

The aqueous coating composition of the invention is therefore preferably an aqueous basecoat composition, i.e., a coating composition which is suitable for producing an aqueous basecoat film. The term "basecoat" is known to the skilled person and is defined for example in Römpp Lexikon, Lacke und Druckfarben, Georg Thieme Verlag 1998.

It has surprisingly been found that the aqueous coating composition of the invention is suitable particularly in the "basecoat/clearcoat" method for applying a basecoat film to an optionally coated substrate, and can therefore be used as a basecoat coating composition.

It has surprisingly been found, moreover, that the presence of the polymeric resin (P2) allows the incorporation into aqueous coating compositions of a polyamide as polymeric resin (P1), which has an acid number <10 mg of KOH per g of polyamide and which can therefore commonly be used only in solvent-based coating compositions. More particularly it has surprisingly been found that the mixture (M) of the polymeric resins (P1) and (P2), or the polyamide (P1) transferred into an aqueous composition by means of (P2), is suitable as a rheological assistant in the aqueous coating composition of the invention.

It has further surprisingly been found that it is essential to the invention that the mixture (M) used in accordance with the invention is obtainable by dispersing of the polymeric resin (P1) in water or an aqueous medium in the presence of the polymeric resin (P2).

It has further surprisingly been found that in particular as a result of the presence of the polymeric resins (P1) and (P2) present in the mixture (M), and/or as a result of the presence of the polymeric resin (P1) transferred into an aqueous phase by means of (P2) in the mixture (M), it is possible to ameliorate or prevent the occurrence of bits, pinholes, pops, runs, and flow defects if a coating composition comprising the mixture (M) is used for at least partly coating an optionally coated substrate with a basecoat film. Moreover, a surprising finding here was that the metallic effect of the coating composition in question is not adversely affected and that the coating compositions of the invention are notable in particular for good properties in relation to the assessment of cloudiness in the finish. It has surprisingly emerged, moreover, that the coating compositions of the invention are notable for a high efficiency of application, meaning that, in comparison to coating compositions commonly used, for a comparable solids content, application at higher film thicknesses can be achieved. High application efficiency, moreover, allows reduced consumption of material (less overspray) and/or fewer waste products. It has surprisingly been found, furthermore, that the coating compositions of the invention are notable for high storage stability even at relatively high temperatures such as temperatures ≥40° C., for example, over a duration of 2 weeks. Customary coating compositions known from the prior art, in which polyamides having an acid number ≥10 or metal silicates, such as the commercially available product Laponite®, for example, are employed as rheological assistants, have disadvantages in relation to at least one of these aforementioned properties. Direct separate incorporation of the polymeric resin (P1) (without prior preparation of a mixture (M) of (P1) and of the polymeric resin (P2)) into aqueous coating compositions is not possible, being accompanied by formation of bits or by a lack of sufficient storage stability on the part of such coating compositions.

The terms "pops", "runs", "pinholes", "flop", "bits", "application efficiency" ("degree of solids utilization"), "rheological assistant" ("rheological additive"), "flow defects", and "leveling" are known to the skilled person and defined for example in Römpp Lexikon, Lacke und Druckfarben, Georg Thieme Verlag 1998.

Coating Composition and Mixture (M) Present Therein

The fractions in wt % of the components (P1) and (P2) (in the form of the mixture (M)), (A1), (B), and water present in the coating composition of the invention, and also of the optionally present components (C) and/or (D) and/or (E) described hereinafter, and also of any organic solvents present and/or any component (A2) present, add up preferably to 100 wt %, based on the total weight of the coating composition.

The term "comprising" in the sense of the present invention, in connection with the coating composition of the invention, has in one preferred embodiment the meaning "consisting of". In this preferred embodiment, with regard to the coating composition of the invention, there may be one or more of the further components, stated hereinafter and present optionally in the coating composition used in accordance with the invention, in the coating composition, such as, for example—besides the components water, (P1) and (P2) (in the form of the mixture (M)), (A1) and (B)—also optionally (A2) and/or (C) and/or (D) and/or (E) and/or organic solvent(s). All of these components may each be present in the coating composition of the invention in their preferred embodiments as stated above and below.

The aqueous coating composition of the invention comprises water as liquid diluent.

The term "aqueous" in connection with the coating composition of the invention refers preferably to those liquid coating compositions which comprise—as liquid diluent, i.e., as liquid solvent and/or dispersion medium—water as principal component. The coating compositions of the invention may, however, optionally include organic solvents in defined fractions. The skilled person knows of the term "organic solvent". This term is defined for example in Council Directive 1999/13/EC of Mar. 11, 1999 (Article 2, section 18) (identified therein as "solvent"). Examples of such organic solvents include (hetero)cyclic, (hetero)aliphatic, or (hetero)aromatic hydrocarbons, mono- or polyfunctional alcohols, ethers, esters, ketones, and amides, such as, for example, N-methylpyrrolidone, N-ethylpyrrolidone, dimethylformamide, toluene, xylene, butanol, ethyl glycol and butyl glycol and also their acetates, butyl diglycol, diethylene glycol dimethyl ether, cyclohexanone, methyl ethyl ketone, methyl isobutyl ketone, acetone, isophorone or mixtures thereof.

The fraction of these organic solvents is preferably at most 40.0 wt %, more preferably at most 35.0 wt %, very preferably at most 30.0 wt %, more particularly at most 25.0 wt % or at most 20.0 wt % or at most 15.0 wt %, more preferably still at most 10.0 wt %, based in each case on the total fraction of the liquid diluents—i.e., liquid solvents and/or dispersion media—present in the coating composition of the invention. In particular the fraction of organic solvents in the coating composition of the invention is at most in a range from 10.0 wt % to 40.0 wt %, based on the total fraction of the liquid diluents—i.e., liquid solvents and/or dispersion media—present in the coating composition of the invention.

The coating composition of the invention preferably has a nonvolatile fraction in the range from 10 to 50 wt %, more preferably in the range from 10 to 45 wt %, very preferably in the range from 10 to 40 wt %, based on the total weight of the coating composition.

The coating composition of the invention is preferably obtainable by the steps (1) and (2), succeeding one another in this order, specifically (1) dispersing the polymeric resin (P1) in water or an aqueous medium in the presence of the polymeric resin (P2) and also, optionally, of a further component (C) and/or optionally organic solvent(s), to give an aqueous dispersion of the mixture (M), and (2) mixing the aqueous dispersion of the mixture (M) obtained by step (1) with the further components used for preparing the coating composition, i.e., at least with components (A1) and (B) and also optionally (A2), optionally (D), optionally (E), and also optionally further water and/or organic solvent.

The dispersing of step (1) takes place in this case preferably at a temperature in the range from 15 to 30° C. over a time of 10 to 60 minutes, preferably over a time of 10 to 30 minutes. The dispersing may take place by means of commercial devices, more particularly dissolvers, such as with the "Dispermat® LC30" device from VWA-Getzmann, Germany, for example. Such devices typically have a stirring disk (toothed disk) located within a stirring vessel. The relative size ratio of the diameter of the stirring disk to the diameter of the stirring vessel in this case is preferably in a range from 1:1.1 to 1:2.5. The peripheral speed of the stirring disk when performing step (1) is preferably in a range from 15 to 25 m/s, more preferably from 15 to 20 m/s. The fill level of the stirring vessel is preferably in a range from 60 to 90%, based on the overall height of the stirring vessel. The diameter of the stirring disk is preferably greater than the distance of the stirring disk from the base of the stirring container. The dispersing of step (1) is preferably accomplished in such a way that a toroidal flow pattern comes about in the process, i.e., a "donut effect" is observed. This term is known to the skilled person.

The mixture (M) is therefore preferably prepared beforehand in the form of an aqueous dispersion of this mixture (M), by dispersing of the polymeric resin (P1) in water or an aqueous medium in the presence of the polymeric resin (P2). This aqueous dispersion of the mixture (M), thus prepared, is used preferably as a component for preparing the coating composition of the invention.

The mixture (M) may be prepared using not only (P1), (P2), and water, and also optionally organic solvent, as per step (1) as described above, but also at least one further component (C).

A suitable component (C) is preferably an emulsifier, preferably such an emulsifier which is different from the polymeric resin (P2). Moreover, the optional component (C) is also different from the polymeric resin (P1). It is also possible for two or more components (C) different from one another to be used.

Any customary emulsifier known to the skilled person is a suitable component (C). Component (C) is preferably selected from the group consisting of lecithins and $C_{12}$-$C_{24}$ fatty alcohol polyglycol ethers. The polyglycol ethers used here may be fully or partially etherified with $C_{12}$-$C_{24}$ fatty alcohols. A suitable lecithin, i.e., a suitable phospholipid, is Lipotin® A, for example, which is available commercially. Also suitable is soya lecithin. Examples of suitable $C_{12}$-$C_{24}$ fatty alcohol polyglycol ethers are the commercially available products Lutensol® ON 60 and Lutensol® XP 70.

If at least one further component (C) is used for preparing the mixture (M), the relative weight ratio of the polyester used as polymeric resin (P2) to component (C) is preferably in the range from 50:1 to 1.5:1, more preferably in the range from 35:1 to 1.75:1, very preferably in the range from 30:1 to 2:1, especially preferably in the range from 10:1 to 4:1.

The at least one further component (C) is present in the coating composition preferably in an amount of 0.05 to 5 wt %, more preferably of 0.05 to 3 wt %, based in each case on the total weight of the coating composition.

The mixture (M) of the at least one polymeric resin (P1) and the at least one polymeric resin (P2), different therefrom, is preferably present in the coating composition of the invention in an amount in a range from 0.5 to 15 wt %, more preferably from 0.75 to 10 wt %, very preferably from 1.0 to 8.5 wt %, especially preferably from 1.5 to 7.5 wt %, most preferably from 1.0 to 5.0 wt %, based in each case on the total weight of the coating composition.

The coating composition of the invention comprises the polyamide, used as polymeric resin (P1) within the mixture (M), based on its solids content, preferably in an amount in a range from 0.05 to 5 wt %, more preferably in an amount in a range from 0.1 to 4.5 wt %, very preferably in an amount in a range from 0.15 to 4 wt %, more preferably still in an amount in a range from 0.2 to 3.5 wt %, more particularly in an amount in a range from 0.25 to 3 wt %, based in each case on the total weight of the coating composition. The amount of the polyamide in wt % in the basecoat composition of the invention refers here in each case to the polyamide per se, i.e., to its solids content.

The coating composition of the invention comprises the polyester, used as polymeric resin (P2) within the mixture (M), based on its solids content, preferably in an amount in a range from 0.4 to 10 wt %, more preferably in an amount in a range from 0.6 to 9 wt %, very preferably in an amount in a range from 0.8 to 8 wt %, more preferably still in an amount in a range from 1 to 6 wt %, more particularly in an amount in a range from 1.5 to 5 wt %, based in each case on the total weight of the coating composition. The amount of the polyester in wt % in the basecoat composition of the invention refers here in each case to the polyester per se, i.e., to its solids content.

The relative weight ratio of the polymeric resins (P2) and (P1) to one another, based in each case on their solids content, in the mixture (M) or in the coating composition of the invention, is preferably in a range from 15:1 to 1:1, more preferably in a range from 12.5 to 1.1:1, very preferably in a range from 10:1 to 1.5:1, more preferably still in a range from 8:1 to 1.5:1, more particularly in a range from 7:1 to 1.5:1, most preferably in a range from 6.5:1 to 1.5:1.

The polyamide used as polymeric resin (P1) is present in the mixture (M) used in accordance with the invention in an amount preferably in a range from 0.1 to 15 wt %, more preferably from 0.2 to 12.5 wt %, very preferably from 0.5 to 10 wt %, more preferably still from 0.75 to 9 wt %, most preferably from 1 to 8 wt % or from 1 to 7 wt %, based in each case on the total weight of the mixture (M) used in accordance with the invention.

The polyester used as polymeric resin (P2) is present in the mixture (M) used in accordance with the invention in an amount preferably in a range from 2.5 to 25 wt %, more preferably from 3.5 to 22.5 wt %, very preferably from 4.5 to 20 wt %, more preferably still from 5 to 19 wt %, most preferably from 6 to 18 wt %, based in each case on the total weight of the mixture (M) used in accordance with the invention.

Polymeric Resin (P1)

The polyamide used as polymeric resin (P1) has an acid number <10 mg of KOH per g of polyamide. The polyamide used as polymeric resin (P1) preferably has an acid number <9 mg of KOH per g of polyamide, more preferably <8 mg of KOH per g of polyamide, very preferably ≤7 mg of KOH per g of polyamide. The polymeric resin (P1) preferably has an acid number in a range from 0 to <10.0 mg of KOH per g of polyamide, more preferably in a range from 0.1 to <10.0 mg of KOH per g of polyamide, very preferably in a range from 0.1 to <9.0 mg of KOH per g of polyamide, most preferably in a range from 0.1 to 8.0 mg of KOH per g of polyamide. In another preferred embodiment, the polymeric resin (P1) has an acid number in a range from 0.1 to <10 mg of KOH per g of polyamide, more preferably in a range from 0.1 to 9 mg or from 0.5 to 9 mg of KOH per g of polyamide, very preferably in a range from 0.1 to 8 mg or from 0.5 to 8 mg of KOH per g of polyamide, especially preferably in a range from 0.1 to ≤7 mg or from 0.5 to ≤7 mg of KOH per g of polyamide. The acid number is determined in accordance with the method described below.

Any customary polyamide known to the skilled person may be used as polymeric resin (P1), provided this polyamide has an acid number <10 mg of KOH per g of polyamide. The polyamide in question may be a polyamide homopolymer or copolymer. Also used as polymeric resin component (P1) may be a mixture of two or more polyamides different from one another.

The polyamide used as polymeric resin (P1) preferably has an amine number <9 mg of KOH per g of polyamide, more preferably <8 mg of KOH per g of polyamide, very preferably ≤7 mg of KOH per g of polyamide. The polyamide used as polymeric resin (P1) preferably has an amine number in a range from 0.1 to <10 mg of KOH per g of polyamide, more preferably in a range from 0.1 to 9 mg or from 0.5 to 9 mg of KOH per g of polyamide, very preferably in a range from 0.1 to 8 mg or from 0.5 to 8 mg of KOH per g of polyamide, especially preferably in a range from 0.1 to ≤7 mg or from 0.5 to ≤7 mg of KOH per g of polyamide. The skilled person knows of methods for determining the amine number. The amine number is determined preferably in accordance with DIN 16945 (date: March 1989).

The polyamide used as polymeric resin (P1) preferably has a number-average molecular weight in a range from 100 g/mol to 5000 g/mol, more preferably in a range from 150 g/mol to 4000 g/mol, very preferably in a range from 200 g/mol to 3000 g/mol, especially preferably in a range from 250 g/mol to 2000 g/mol, most preferably in a range from 400 g/mol to 1500 g/mol. The skilled person is aware of methods for determining the number-average molecular weight. The number-average molecular weight is determined in accordance with the method below.

The polyamide used in accordance with the invention as polymeric resin (P1) is preferably obtainable by reaction of at least one polycarboxylic acid (C1a) with at least one polyamine (C1b), optionally in the presence of at least one monocarboxylic acid, more particularly at least one $C_{12}$-$C_{24}$ monocarboxylic acid, and/or of at least one monoamine such as a $C_2$-$C_{12}$ monoamine, for example.

The polyamide used in accordance with the invention as polymeric resin (P1) is preferably obtainable by reaction of at least one polycarboxylic acid (C1a) selected from the group consisting of aliphatic $C_3$-$C_{22}$ dicarboxylic acids, polymers such as dimers and trimers of aliphatic $C_{12}$-$C_{24}$ monocarboxylic acids, and mixtures thereof, with at least one aliphatic $C_2$-$C_{12}$ diamine (C1b).

The reaction of at least one polycarboxylic acid (C1a) and at least one polyamine (C1b) is carried out preferably in a preferably organic solvent.

The polyamide used in accordance with the invention as polymeric resin (P1) is preferably obtainable by reaction of at least one polycarboxylic acid (C1a), preferably of at least one polycarboxylic acid selected from the group consisting of aliphatic $C_3$-$C_{22}$ dicarboxylic acids, polymers such as dimers and trimers of aliphatic $C_{12}$-$C_{24}$ monocarboxylic acids, and mixtures thereof, with at least one polyamine (C1b), preferably with at least one aliphatic $C_2$-$C_{12}$ diamine (C1b), with the reaction product then obtained being optionally contacted thereafter with at least one preferably basic neutralizing agent. Here, through reaction of free carboxyl groups with the neutralizing agent, the acid number of the reaction product obtained can be adjusted, allowing an acid number <10 mg KOH/g reaction product to be achieved.

The polyamide used in accordance with the invention as polymeric resin (P1) is available commercially: examples include the commercially available products Thixatrol® P220X-MF, Disparlon® A6900-20X, Disparlon® A650-20X, Disparlon® A670-20M, Disparlon F-9030, Disparlon® 6900-20X, Luvotix® AB, Luvotix® PA 20 XA, Luvotix® R-RF, Luvotix® HT-SF, Luvotix® HAT 400, Luvotix® HT, Troythix® 250 XF, Byk-430, and Byk-431.

Polymeric Resin (P2)

Any customary polyester known to the skilled person may be used as polymeric resin (P2), provided this polyester is at least obtainable by reaction of at least one polymerized aliphatic $C_{12}$-$C_{24}$ monocarboxylic acid with at least one diol and/or polyol. The polyester in question may be a polyester homopolymer or copolymer. Also used as polymeric resin component (P2) may be a mixture of two or more polyesters different from one another. The term "at least obtainable" refers in this respect, in the sense of the present invention, to the possibility of using, in addition to the at least one polymerized aliphatic $C_{12}$-$C_{24}$ monocarboxylic acid and the at least one diol and/or polyol, optionally, further starting components for preparing the polyester (P2), such as, for example, at least one aliphatic $C_{12}$-$C_{24}$ monocarboxylic acid and/or such as at least one dicarboxylic acid and/or at least one tricarboxylic acid selected from the group consisting of aliphatic $C_3$-$C_{12}$ dicarboxylic acids, cycloaliphatic $C_5$-$C_{12}$ dicarboxylic acids, aromatic $C_8$-$C_{12}$ dicarboxylic acids, aliphatic $C_5$-$C_{12}$ tricarboxylic acids, cycloaliphatic $C_6$-$C_{12}$ tricarboxylic acids, and aromatic $C_9$-$C_{12}$ tricarboxylic acids.

The polymeric resin (P2) serves preferably as an emulsifier, in order to transfer the polymeric resin (P1) into an aqueous phase.

The polyester used as polymeric resin (P2) preferably has an acid number in a range from 20 to 50 mg of KOH per g of polyester. More preferably the polyester used as polymeric resin (P2) has an acid number in a range from 20 to 45 mg of KOH per g of polyester, very preferably in a range from 25 to 40 mg of KOH per g of polyester, especially preferably in a range from 30 to 38 mg of KOH per g of polyester. The skilled person knows of methods for determining the acid number. The acid number is determined in accordance with the method described below.

The polyester used as polymeric resin (P2) preferably has an OH number (hydroxyl number) in a range from 20 to 300 mg of KOH per g of polyester. More preferably the polyester used as polymeric resin (P2) has an OH number in a range from 25 to 250 mg of KOH per g of polyester, very preferably in a range from 25 to 200 mg of KOH per g of polyester, especially preferably in a range from 25 to 150 mg of KOH per g of polyester or in a range from 30 to 120 mg of KOH per g of polyester. The skilled person knows of methods for determining the OH number. The OH number is determined in accordance with the method described below.

In another preferred embodiment, the polyester used as polymeric resin (P2) has an OH number of at most 300 mg of KOH, more preferably of at most 250 mg of KOH, very preferably of at most 200 mg of KOH, more preferably still of at most 150 mg of KOH, especially preferably of at most 120 mg of KOH, in each case per g of polyester.

The polyester used as polymeric resin (P2) preferably has
an acid number in a range from 20 to 50 mg of KOH per g of polyester, more preferably in a range from 20 to 45 mg of KOH per g of polyester, very preferably in a range from 25 to 40 mg of KOH per g of polyester, especially preferably in a range from 30 to 38 mg of KOH per g of polyester, and/or a hydroxyl number in a range from 20 to 300 mg of KOH per g of polyester, more preferably in a range from 25 to 250 mg of KOH per g of polyester, very preferably in a range from 25 to 200 mg of KOH per g of polyester, especially preferably in a range from 25 to 150 mg of KOH per g of polyester or in a range from 30 to 120 mg of KOH per g of polyester.

The polyester used as polymeric resin (P2) preferably has a number-average molecular weight in a range from 500 g/mol to 100 000 g/mol, more preferably in a range from 700 g/mol to 90 000 g/mol, very preferably in a range from 1000 g/mol to 80 000 g/mol, especially preferably in a range from 1000 g/mol to 60 000 g/mol or in a range from 2000 g/mol to 60 000 g/mol or in a range from 2000 g/mol to 50 000 g/mol, most preferably in a range from 2000 g/mol to 10 000 g/mol or in a range from 2000 g/mol to 6000 g/mol. The skilled person knows of methods for determining the number-average molecular weight. The number-average molecular weight is determined in accordance with the method below.

The polyester used in accordance with the invention as polymeric resin (P2) is at least obtainable by reaction of at least one polymerized aliphatic $C_{12}$-$C_{24}$ monocarboxylic acid with at least one diol and/or polyol. Here it is possible in each case to use not only the free acids, but also, moreover, corresponding suitable derivatives such as corresponding esters and/or anhydrides and also corresponding salts.

The term "polymerized aliphatic $C_{12}$-$C_{24}$ monocarboxylic acid" refers in the sense of the present invention preferably to a polymer, more particularly a dimer and/or trimer, of an aliphatic $C_{12}$-$C_{24}$ monocarboxylic acid. This term is known to the skilled person.

The skilled person is also aware of preparation processes for the provision of polymers, more particularly dimers and trimers, of aliphatic $C_{12}$-$C_{24}$ monocarboxylic acids, in other words for the provision of polymerized aliphatic $C_{12}$-$C_{24}$ monocarboxylic acids, such as, for example, dimerized, trimerized and/or more highly polymerized, especially dimerized and/or trimerized, aliphatic $C_{12}$-$C_{24}$ monocarboxylic acids, from DE 25 06 211 A1, U.S. Pat. No. 2,793,219 A, and U.S. Pat. No. 2,955,121 A, for example. The polymerized aliphatic $C_{14}$-$C_{22}$ monocarboxylic acids may optionally be substituted one or more times, as for example two, three, four, or five times, preferably by at least one substituent selected from the group consisting of OH, O—$C_{1-4}$ aliphatic radicals, =O, $NH_2$, $NH(C_{1-4}$ aliphatic radicals), $N(C_{1-4}$ aliphatic radicals), where the substitution may take place on the same or on different carbon atoms. Starting materials used for preparing such polymerized aliphatic $C_{12}$-$C_{24}$ monocarboxylic acids are at least monounsaturated aliphatic $C_{12}$-$C_{24}$ monocarboxylic acids. The resulting polymerized, such as dimerized and trimerized, aliphatic $C_{12}$-$C_{24}$ monocarboxylic acids may in each case be separated from one another by means of distillation and also in each case from higher polymerization products, and may optionally be subjected to further conversion reactions such as hydrogenation, for example.

The at least one polymerized aliphatic $C_{12}$-$C_{24}$ monocarboxylic acid used for preparing the polyester employed as polymeric resin (P2) is preferably a dimerized and/or trimerized, more particularly at least a dimerized, $C_{12}$-$C_{24}$ monocarboxylic acid.

Polymerized, especially dimerized and trimerized, $C_{12}$-$C_{24}$ monocarboxylic acids are available commercially. Examples of commercial dimerized fatty acids are the products Empol 1003, Empol 1005, Empol 1008, Empol 1012, Empol 1016, Empol 1026, Empol 1028, Empol 1061, Empol 1062, Pripol 1006, Pripol 1009, Pripol 1012, Pripol 1013, Pripol 1017, Pripol 1022, Pripol 1025, Pripol 1027 from Croda, and examples of commercially available trimerized fatty acids are the products Empol 1043 from BASF and Pripol 1040 from Croda.

The term "aliphatic $C_{12}$-$C_{24}$ monocarboxylic acid" refers in the sense of the present invention preferably to a saturated or unsaturated, preferably unsaturated, aliphatic $C_{12}$-$C_{24}$ monocarboxylic acid having a total of 12-24, i.e., 12, 13, 14, 15, 16, 17, 18, 19, 20, 21, 22, 23, or 24 carbon atoms, preferably an aliphatic $C_{14}$-$C_{22}$ monocarboxylic acid having a total of 14-22, i.e., 14, 15, 16, 17, 18, 19, 20, 21, or 22 carbon atoms, or an aliphatic $C_{16}$-$C_{20}$ monocarboxylic acid having a total of 16-20, i.e., 16, 17, 18, 19, or 20 carbon atoms, having in each case precisely one —C(=O)—OH group, i.e., an aliphatic $C_{12}$-$C_{24}$ monocarboxylic acid which in addition to this one —C(=O)—OH group has a $C_{11}$-$C_{23}$ aliphatic radical having a total of 11-23, i.e., 11, 12, 13, 14, 15, 16, 17, 18, 19, 20, 21, 22, or 23 carbon atoms, preferably a $C_{13}$-$C_{21}$ aliphatic radical having a total of 13-21, i.e., 13, 14, 15, 16, 17, 18, 19, 20, or 21 carbon atoms, or a $C_{15}$-$C_{19}$ aliphatic radical having a total of 15-19, i.e., 15, 16, 17, 18, or 19 carbon atoms. The expression "aliphatic" here encompasses preferably acyclic saturated or unsaturated, preferably unsaturated, branched or unbranched aliphatic radicals. Unsaturated aliphatic radicals here have at least one, preferably 1, 2, 3, 4, or 5, more preferably 1, 2, 3, or 4, very preferably 1, 2, or 3 carbon double bond(s). The aliphatic $C_{12}$-$C_{24}$ monocarboxylic acids may be natural or synthesized fatty acids. The aliphatic $C_{12}$-$C_{24}$ monocarboxylic acids may optionally be substituted one or more times, as for example two, three, four, or five times, preferably by at least one substituent selected from the group consisting of OH, O—$C_{1-4}$ aliphatic radicals, =O, $NH_2$, $NH(C_{1-4}$ aliphatic radicals), $N(C_{1-4}$ aliphatic radicals), it being possible for the substitution to be on identical or on different carbon atoms. Preference is given to aliphatic $C_{12}$-$C_{24}$ monocarboxylic acids selected from the group consisting of myristic acid, pentadecanoic acid, palmitic acid, margaric acid, stearic acid, nonadecanoic acid, arachidic acid, henicosanoic acid, docosanoic acid, myristoleic acid, palmitoleic acid, petroselinic acid, oleic acid, elaidic acid, vaccenic acid, gadoleic acid, icosenoic acid, cetoleic acid, erucic acid, linoleic acid, linolenic acid, calendulic acid, punicic acid, eleostearic acid, arachidonic acid, timnodonic acid, clupanodonic acid, and cervonic acid, and also ricinoleic acid. Preference is given to aliphatic $C_{16}$-$C_{20}$ monocarboxylic acids selected from the group consisting of palmitic acid, margaric acid, stearic acid, nonadecaneoic acid, arachic acid, palmitoleic acid, petroselinic acid, oleic acid, elaidic acid, vaccenic acid, gadoleic acid, icosenoic acid, linoleic acid, linolenic acid, calendulic acid, punicic acid, eleostearic acid, arachidonic acid, and timnodonic acid, and also ricinoleic acid. Preference is given to aliphatic $C_{18}$ monocarboxylic acids selected from the group consisting of stearic acid, petroselinic acid, oleic acid, elaidic acid, vaccenic acid, linoleic acid, linolenic acid, calendulic acid, punicic acid, and eleostearic acid, and also ricinoleic acid, more particularly selected from the group consisting of stearic acid, oleic acid, linoleic acid and linolenic acid, and ricinoleic acid, most preferably selected from the group consisting of oleic acid, linoleic acid and linolenic acid, and ricinoleic acid.

The polyester used as polymeric resin (P2) is preferably at least obtainable by reaction of at least one aliphatic polymerized, preferably at least one dimerized and/or trimerized, aliphatic $C_{12}$-$C_{24}$ monocarboxylic acid and optionally at least one aliphatic $C_{12}$-$C_{24}$ monocarboxylic acid with at least one $C_2$-$C_{20}$ polyol and/or $C_2$-$C_{20}$ diol.

The structural units obtainable from the at least one polymerized aliphatic $C_{12}$-$C_{24}$ monocarboxylic acid used for preparing the polyester employed as polymeric resin (P2) are preferably present in the polyester in an amount in a range from 10 to 80 mol %, preferably 10 to 60 mol %, more preferably 10 to 40 mol %, based on the total weight of the polyester. The at least one polymerized aliphatic $C_{12}$-$C_{24}$ monocarboxylic acid used for preparing the polyester employed as polymeric resin (P2) is more preferably a dimerized and/or trimerized $C_{12}$-$C_{24}$ monocarboxylic acid, and the structural units obtainable therefrom are present in the polyester in an amount in a range from 10 to 40 mol %, based on the total weight of the polyester. To a skilled person here it is clear that the polymerized aliphatic $C_{12}$-$C_{24}$ monocarboxylic acid used is not integrated entirely into the polyester here, but instead that, in the reaction of the at least one polyol and/or diol with the at least one polymerized aliphatic $C_{12}$-$C_{24}$ monocarboxylic acid, the structural units present in the polyester are built up only with elimination of water, through formation of ester bonds. With particular preference the at least one polymerized aliphatic $C_{12}$-$C_{24}$ monocarboxylic acid used for preparing the polyester employed as polymeric resin (P2) is a dimerized and/or trimerized $C_{12}$-$C_{24}$ monocarboxylic acid, and the structural unit obtainable therefrom is present in the polyester in an amount in a range from 12 to 38 mol %, very preferably in a range from 14 to 36 mol % or in a range from 16 to 34 mol % or in a range from 18 to 32 mol % or in a range from 20 to 30 mol % or in a range from 22 to 28 mol %, especially preferably in a range from 23 to 26 mol %, based in each case on the total weight of the polyester.

The term "polyol" refers in the sense of the present invention preferably to a component which has at least three, preferably primary, hydroxyl groups. Overall, however, a polyol may preferably have up to and including 10 hydroxyl groups—that is, in addition to the at least two primary hydroxyl groups, up to and including 8 further hydroxyl groups. The term "polyol" therefore embraces, in particular, triols. A "polyol" in the sense of the present invention may be a (hetero)aliphatic, (hetero)cycloaliphatic or (hetero)aromatic polyol. The polyol used is preferably an aliphatic, preferably saturated, polyol. The polyol is preferably a triol. The polyols used in accordance with the invention have preferably 2 to 20, more preferably 2 to 12, carbon atoms per molecule, i.e., they are preferably $C_2$-$C_{20}$ polyols, more preferably $C_2$-$C_{12}$ polyols. The polyol may optionally be substituted one or more times, as for example two, three, four, or five times, preferably by at least one substituent selected from the group consisting of OH, O—$C_{1-4}$ aliphatic radicals, =O, NH$_2$, NH($C_{1-4}$ aliphatic radicals), N($C_{1-4}$ aliphatic radicals), it being possible for the substitution to be on the same or on different carbon atoms.

The term "diol" refers in the sense of the present invention preferably to a component which has two, preferably primary, hydroxyl groups. A "diol" in the sense of the present invention may be a (hetero)aliphatic, (hetero)cycloaliphatic, or (hetero)aromatic diol. The diol used is preferably an aliphatic, preferably saturated, diol. The diols used in accordance with the invention have preferably 2 to 20, more preferably 2 to 12, carbon atoms per molecule, i.e., they are preferably $C_2$-$C_{20}$ diols, more preferably $C_2$-$C_{12}$ diols. The diol may optionally be substituted one or more times, as for example two, three, four, or five times, preferably by at least one substituent selected from the group consisting of OH, O—$C_{1-4}$ aliphatic radicals, =O, NH$_2$, NH($C_{1-4}$ aliphatic radicals), N($C_{1-4}$ aliphatic radicals), it being possible for the substitution to be on the same or on different carbon atoms.

More preferably the diol and/or polyol used for preparing the polyester employed in accordance with the invention as polymeric resin (P2) is selected from the group consisting of aliphatic $C_2$-$C_{20}$ polyols and/or aliphatic $C_2$-$C_{20}$ diols. Very preferably the diol used for preparing the polyester employed in accordance with the invention as polymeric resin (P2) is selected from the group consisting of aliphatic $C_2$-$C_{12}$ diols.

The term "aliphatic $C_2$-$C_{20}$ polyol" or "aliphatic $C_2$-$C_{20}$ diol" refers in the sense of the present invention preferably to a saturated or unsaturated, preferably a saturated, aliphatic $C_2$-$C_{20}$ polyol or $C_2$-$C_{20}$ diol having a total of 2-20, i.e., 2, 3, 4, 5, 6, 7, 8, 9, 10, 11, 12, 13, 14, 15, 16, 17, 18, 19, or 20, carbon atoms, preferably an aliphatic $C_2$-$C_{12}$ polyol or aliphatic $C_2$-$C_{12}$ diol having a total of 2-12, i.e., 2, 3, 4, 5, 6, 7, 8, 9, 10, 11, or 12 carbon atoms, which has in each case precisely two —OH groups, preferably terminal —OH groups. The expression "aliphatic" here encompasses preferably acyclic saturated or unsaturated, preferably saturated, branched or unbranched aliphatic radicals. Unsaturated aliphatic radicals have in this case at least one, preferably 1, 2, 3, 4, or 5, more preferably 1, 2, 3, or 4, very preferably 1, 2, or 3, carbon double bonds. The aliphatic $C_2$-$C_{20}$ polyol or $C_2$-$C_{20}$ diol may optionally be substituted one or more times, as for example two, three, four, or five times, preferably by at least one substituent selected from the group consisting of OH, O—$C_{1-4}$ aliphatic radicals, =O, NH$_2$, NH($C_{1-4}$ aliphatic radicals), N($C_{1-4}$ aliphatic radicals), it being possible for the substitution to be on the same or on different carbon atoms. The aliphatic $C_2$-$C_{20}$ polyols are preferably selected from the group consisting of ethylene glycol, propylene glycol (1,2-propanediol), trimethylene glycol (1,3-propanediol), 1,4-dihydroxybutane (1,4-butanediol), 1,5-dihydroxypentane, 1,6-dihydroxyhexane (1,6-hexanediol), neopentyl glycol, and 1,1,1-trimethylolpropane (TMP). The aliphatic $C_2$-$C_{20}$ diols are preferably selected from the group consisting of ethylene glycol, propylene glycol (1,2-propanediol), trimethylene glycol (1,3-propanediol), 1,4-dihydroxybutane (1,4-butanediol), 1,5-dihydroxypentane, 1,6-dihydroxyhexane (1,6-hexanediol), and neopentyl glycol.

To prepare the polyester used as polymeric resin (P2) it is possible optionally to use—in addition to the at least one polymerized aliphatic $C_{12}$-$C_{24}$ monocarboxylic acid and the at least one diol and/or polyol—also at least one aliphatic $C_{12}$-$C_{24}$ monocarboxylic acid, preferably at least one aliphatic $C_{16}$-$C_{20}$ monocarboxylic acid. It is possible here to use the same aliphatic $C_{12}$-$C_{24}$ monocarboxylic acids which are also suitable for preparing aliphatic polymerized $C_{12}$-$C_{24}$ monocarboxylic acids. Particularly suitable for this purpose is at least one such aliphatic $C_{12}$-$C_{24}$ monocarboxylic acid, preferably at least one such aliphatic $C_{16}$-$C_{20}$ monocarboxylic acid which is at least monounsaturated and/or whose aliphatic radical is substituted by at least one OH group. An example of an aliphatic $C_{12}$-$C_{24}$ monocarboxylic acid of this kind is ricinoleic acid. Optionally at least one aliphatic $C_{12}$-$C_{24}$ monocarboxylic acid used for preparing the polyester employed as polymeric resin (P2) is used, and the structural unit obtainable from this acid is present in the polyester in an amount in a range from 0 to 20 mol %, very preferably in a range from 0 to 10 mol %, based in each case on the total weight of the polyester.

To prepare the polyester used as polymeric resin (P2) it is possible optionally to use at least one further component. To prepare the polyester used as polymeric resin (P2), it is preferred to make use additionally of at least one dicarboxylic acid and/or at least one tricarboxylic acid—or suitable usable derivatives thereof such as corresponding anhydrides and/or esters, for example—selected from the group consisting of aliphatic $C_3$-$C_{12}$ dicarboxylic acids, cycloaliphatic $C_5$-$C_{12}$ dicarboxylic acids, aromatic $C_8$-$C_{12}$ dicarboxylic acids, aliphatic $C_5$-$C_{12}$ tricarboxylic acids, cycloaliphatic $C_6$-$C_{12}$ tricarboxylic acids, and aromatic $C_9$-$C_{12}$ tricarboxylic acids, more preferably selected from the group consisting of cycloaliphatic $C_5$-$C_{12}$ dicarboxylic acids and aromatic $C_9$-$C_{12}$ tricarboxylic acids and aromatic $C_8$-$C_{12}$ dicarboxylic acids. The polyester used as polymeric resin (P2) contains preferably 3 to 40 mol %, more preferably 5 to 30 mol %, based on the total fraction of 100 mol % of all structural units of the polyester, of structural units which result from the use of at least one dicarboxylic acid and/or at least one tricarboxylic acid for preparing the polyester.

To prepare the polyester used as polymeric resin (P2), preference is given to making additional use of at least one dicarboxylic acid and/or at least one tricarboxylic acid selected from the group consisting of aliphatic $C_3$-$C_{12}$ dicarboxylic acids, cycloaliphatic $C_5$-$C_{12}$ dicarboxylic acids, aromatic $C_8$-$C_{12}$ dicarboxylic acids, aliphatic $C_5$-$C_{12}$ tricarboxylic acids, cycloaliphatic $C_6$-$C_{12}$ tricarboxylic acids, and aromatic $C_9$-$C_{12}$ tricarboxylic acids, and optionally additionally at least one aliphatic $C_{12}$-$C_{24}$ monocarboxylic acid.

The term "aliphatic $C_3$-$C_{12}$ dicarboxylic acid" refers in the sense of the present invention preferably to a saturated or unsaturated, preferably saturated, aliphatic $C_3$-$C_{12}$ dicarboxylic acid having a total of 3 to 12, i.e., 3, 4, 5, 6, 7, 8, 9, 10, 11, or 12 carbon atoms, and having in each case precisely two —C(=O)—OH groups, i.e., for example, an aliphatic $C_3$-$C_{22}$ dicarboxylic acid which as well as these two —C(=O)—OH groups has a $C_1$-$C_{20}$ aliphatic radical having a total of 1 to 20 carbon atoms. The expression "aliphatic" here encompasses preferably acyclic saturated or unsaturated, preferably unsaturated, branched or unbranched aliphatic radicals. To the skilled person is it clear that an unsaturated bond within the $C_3$-$C_{22}$ dicarboxylic acid is possible in this case only starting from $C_4$-$C_{22}$ dicarboxylic acids. In that case, unsaturated aliphatic radicals have at least one, preferably 1, 2, 3, 4, or 5, more preferably 1, 2, 3, or 4, very preferably 1, 2, or 3, carbon double bond(s). The aliphatic $C_3$-$C_{22}$ dicarboxylic acids may be natural or synthesized carboxylic acids. The aliphatic $C_3$-$C_{22}$ dicarboxylic acids may be optionally substituted one or more times, as for example two, three, four, or five times, preferably by at least one substituent selected from the group consisting of OH, O—$C_{1-4}$ aliphatic radicals, =O, $NH_2$, $NH(C_{1-4}$ aliphatic radicals), $N(C_{1-4}$-aliphatic radicals), it being possible for the substitution to be on the same or on different carbon atoms. Preferred are aliphatic $C_3$-$C_{22}$ dicarboxylic acids selected from the group consisting of malonic acid, succinic acid, glutaric acid, adipic acid, pimelic acid, suberic acid, azelaic acid, sebacic acid, undecanedicarboxylic acid, dodecanedicarboxylic acid, tridecanedicarboxylic acid, tetradecanedicarboxylic acid, and hexadecanedicarboxylic acid.

In contrast to the aliphatic $C_3$-$C_{12}$ dicarboxylic acids, aliphatic $C_5$-$C_{12}$ tricarboxylic acids have at least 5 carbon atoms and three instead of two carboxyl groups.

The term "cycloaliphatic $C_5$-$C_{12}$ dicarboxylic acid" refers in the sense of the present invention preferably to a saturated or unsaturated, preferably saturated, cycloaliphatic $C_5$-$C_{12}$ dicarboxylic acid having a total of 5-12, i.e., 5, 6, 7, 8, 9, 10, 11, or 12 carbon atoms, and having in each case precisely two —C(=O)—OH groups, i.e., for example, a cycloaliphatic $C_5$-$C_{12}$ dicarboxylic acid which as well as these two —C(=O)—OH groups has a $C_3$-$C_{10}$ cycloaliphatic radical having a total of 3 to 10 carbon atoms. The expression "cycloaliphatic" here encompasses preferably cyclic saturated or unsaturated, preferably unsaturated, cycloaliphatic radicals. The cycloaliphatic $C_5$-$C_{12}$ dicarboxylic acids may be optionally substituted one or more times, as for example two, three, four, or five times, preferably by at least one substituent selected from the group consisting of OH, O—$C_{1-4}$ aliphatic radicals, =O, $NH_2$, $NH(C_{1-4}$ aliphatic radicals), $N(C_{1-4}$ aliphatic radicals), it being possible for the substitution to be on the same or on different carbon atoms. Preferred are cycloaliphatic $C_5$-$C_{12}$ dicarboxylic acids selected from the group consisting of hexahydrophthalic acid or hexahydrophthalic anhydride, hexahydroterephthalic acid or hexahydroterephthalic anhydride, hexahydroisophthalic acid or hexahydroisophthalic anhydride. Cycloaliphatic $C_6$-$C_{12}$ tricarboxylic acids, in contrast to the cycloaliphatic $C_5$-$C_{12}$ dicarboxylic acids, have at least 6 carbon atoms and three instead of two carboxyl groups.

The term "aromatic $C_8$-$C_{12}$ dicarboxylic acid" refers in the sense of the present invention preferably to an aromatic $C_8$-$C_{22}$ dicarboxylic acid having a total of 8-12, i.e., 8, 9, 10, 11, or 12 carbon atoms, and having in each case precisely two —C(=O)—OH groups, i.e., for example, an aromatic $C_8$-$C_{12}$ dicarboxylic acid which as well as these two —C(=O)—OH groups has a $C_6$-$C_{10}$ aromatic radical having a total of 6 to 10 carbon atoms. The aromatic $C_8$-$C_{12}$ dicarboxylic acids may optionally be substituted one or more times, as for example two, three, four, or five times, preferably by at least one substituent selected from the group consisting of OH, O—$C_{1-4}$ aliphatic radicals, =O, $NH_2$, $NH(C_{1-4}$ aliphatic radicals), $N(C_{1-4}$ aliphatic radicals), it being possible for the substitution to be on the same or on different carbon atoms. The aromatic $C_8$-$C_{12}$ dicarboxylic acids are preferably selected from the group consisting of terephthalic acid, isophthalic acid, ortho-phthalic acid and/or trimellitic acid and/or their anhydrides and/or esters. Aromatic $C_9$-$C_{12}$ tricarboxylic acids, in contrast to the aromatic $C_8$-$C_{12}$ dicarboxylic acids, have at least 9 carbon atoms and three instead of two carboxyl groups.

The skilled person is aware of suitable polyesters which can be used as polymeric resin (P2), and of their preparation, from DE 40 09 858 A1, for example.

Binder (A)

The binder (A) used in the aqueous coating composition of the invention is preferably a water-soluble or dispersible binder.

The term "binder" is understood within the meaning of the present invention, in line with DIN EN ISO 4618 (German version, date: March 2007), to refer preferably to the nonvolatile fractions of a coating composition that are responsible for film-forming, with the exception of pigments (B) and any fillers present in the composition, and more particularly to the polymeric resins that are responsible for film-forming. The nonvolatile fraction may be determined in accordance with the method described hereinafter.

Suitable polymeric resins (A1) are all customary polymeric resins (A1) known to the skilled person, such as self-crosslinking and nonself-crosslinking polymeric resins (A1). Where nonself-crosslinking polymeric resins (A1) are used, the binder (A) used in accordance with the invention may also include a crosslinking agent (A2). Suitable polymeric resins (A1) including crosslinking agents (A2) present where appropriate, are known from EP 0 228 003 A1, DE 44 38 504 A1, EP 0 593 454 B1, DE 199 48 004 A1, EP 0 787 159 B1, DE 40 09 858 A1, DE 44 37 535 A1, WO 92/15405 A1 and WO 2005/021168 A1, for example, especially from EP 0 228 003 A1, DE 199 48 004 A1, DE 40 09 858 A1, and DE 44 37 535 A1.

The binder (A) preferably comprises at least one polymeric resin (A1) which optionally has reactive functional groups which permit a crosslinking reaction.

The polymeric resin (A1) is different from the polymeric resins (P1) and (P2).

The polymeric resin (A1) of the binder (A) used in accordance with the invention has preferably crosslinkable reactive functional groups. Any customary crosslinkable reactive functional group known to the skilled person is suitable here. The at least one polymeric resin of the binder (A) preferably has at least one kind of functional reactive groups selected from the group consisting of primary amino groups, secondary amino groups, hydroxyl groups, thiol groups, carboxyl groups, carbamate groups, groups which have at least one C=C double bond, such as vinyl groups or (meth)acrylate groups, and epoxide groups, for example. The polymeric resin (A1) of the binder (A) preferably has functional hydroxyl groups.

The expression "(meth)acrylic" or "(meth)acrylate" for the purposes of the present invention encompasses in each case the meanings "methacrylic" and/or "acrylic", and "methacrylate" and/or "acrylate", respectively.

Where the polymeric resin (A1) of the binder (A) has crosslinkable functional groups such as hydroxyl groups, the fraction of crosslinkable functional groups such as hydroxyl groups is preferably in the range from 0.1 wt % to 7.0 wt %, more preferably from 0.25 to 6.5 wt %, very preferably from 0.5 to 6.0 wt %, more particularly from 0.75 to 5.5 wt %, based in each case on the total weight of the solids content of the polymeric resin (A1) of the binder (A).

The polymeric resin (A1) and the crosslinking agent (A2) present optionally are curable or crosslinkable exothermically or endothermically. The polymeric resin (A1) and the crosslinking agent (A2) present optionally are, in particular, curable or crosslinkable thermally. The polymeric resin (A1) and the crosslinking agent (A2) present optionally are preferably curable or crosslinkable within a temperature range from −20° C. up to 250° C. The polymeric resin (A1) and the crosslinking agent (A2) present optionally are crosslinkable preferably at room temperature or at temperatures in the range from 15° C. to 80° C. Room temperature in the sense of the present invention refers preferably to a temperature in the range from 18° C. to 23° C. Alternatively the polymeric resin (A1) and the crosslinking agent (A2) present optionally are crosslinkable only at higher temperatures, as for example crosslinkable at temperatures ≥80° C., more preferably ≥110° C., very preferably ≥140° C. or ≥150° C. With particular advantage the polymeric resin (A1) and the crosslinking agent (A2) present optionally are crosslinkable at 50 to 150° C., more preferably still at 70 to 150° C., and very preferably at 80 to 150° C.

The binder (A) preferably comprises at least one polymeric resin (A1) selected from the group consisting of polyurethanes, polyesters, polyamides, polyureas, polystyrenes, polycarbonates, poly(meth)acrylates, vinyl ester-based resins, epoxy resins, phenol-formaldehyde resins, melamine-formaldehyde resins, phenolic resins and silicone resins, and also mixtures thereof, with preferably 70 to 100 wt % of the polymeric resin being selected from at least one of the aforementioned polymers. Among the stated polymers, preference is given here in each case both to homopolymers and to copolymers. These resins and also their preparation are known to the skilled person. Suitable polyesters are known from DE 40 09 858 A1, for example. Suitable polyurethanes are known from DE 199 48 004 A1 and from EP 0 228 003 A1, for example. The term "polyurethanes" preferably includes, in particular, polyurethane poly(meth)acrylates, i.e., polyurethane-modified poly(meth)acrylates. Such polyurethane poly(meth)acrylates are known to the skilled person from DE 44 37 535 A1, for example.

The binder (A) preferably comprises at least one polymeric resin (A1) selected from the group consisting of polyurethanes, polyureas, polyesters, and poly(meth)acrylates, more particularly selected from the group consisting of polyurethanes and poly(meth)acrylates, with preferably 70 to 100 wt % of the polymeric resin of the binder being selected from at least one of the aforementioned polymers.

There may also be two or more different polymeric resins (A1) present in the binder (A), as for example two or three polymeric resins (A1) in each case different from one another.

In a particularly preferred embodiment, the binder (A) comprises as polymeric resin (A1) at least one polyurethane, with preferably 70 to 100 wt % of the polymeric resin constituting such a polyurethane, and/or as polymeric resin (A1) at least one poly(meth)acrylate, with preferably 70 to 100 wt % of the polymeric resin being selected from such a poly(meth)acrylate, and/or as polymeric resin (A1) at least one polyester, with preferably 70 to 100 wt % of the polymeric resin being selected from such a polyester.

The binder (A) may comprise a polymeric resin (A1) which is crosslinked or cured with participation of isocyanate groups and/or oligomerized or polymerized isocyanate groups, very preferably at least one corresponding polyurethane and/or polyester and/or poly(meth)acrylate.

Where the binder (A) comprises at least one polyurethane as polymeric resin (A1), suitability is possessed in particular by polyurethane-based resins prepared by a polyaddition reaction between hydroxyl-containing compounds such as polyols, including diols (such as, for example, hydroxyl groups of hydroxyl-containing polyesters or hydroxyl-containing polyethers, and also mixtures and copolymers thereof) and at least one isocyanate or polyisocyanate (including aromatic and aliphatic isocyanates, di-, tri- and/or polyisocyanates). Required typically here is a stoichiometric reaction of the OH groups of the polyols with the isocyanate groups of the polyisocyanates. However, the stoichiometric ratio to be employed can also be varied, since the polyisocyanate can be added to the polyol component in amounts such that there may be an "overcrosslinking" or an "undercrosslinking". Besides a reaction of isocyanate groups with OH groups, a further reaction which may occur for crosslinking is, for example, the di- and trimerization of isocyanates (to give uretidiones or isocyanurates). Suitable polyisocyanates and isocyanates include all isocyanates and polyisocyanates which can be used and are stated as crosslinking agents (A2).

Where the binder (A) comprises at least one polyurethane as polymeric resin (A1), a polyester polyol as prepolymer polyol component is suitable with preference for its preparation. Suitable polyester polyols are, in particular, compounds which derive from at least one polyol such as at least one diol, for example, ethylene glycol, propylene glycol (1,2-propanediol), trimethylene glycol (1,3-propanediol), neopentyl glycol, 1,4-butanediol and/or 1,6-hexanediol, or such as at least one triol, such as 1,1,1-trimethylolpropane (TMP), and from at least one dicarboxylic acid such as, for example, adipic acid, terephthalic acid, isophthalic acid, ortho-phthalic acid and/or dimethylolpropionoic acid, and/or from at least one dicarboxylic acid derivative such as a dicarboxylic ester and/or a dicarboxylic anhydride such as phthalic anhydride. Especially preferred is a polyester polyol of this kind, used as prepolymer polyol component, which derives from at least one diol and/or triol selected from the group consisting of 1,6-hexanediol, neopentyl glycol, trimethylolpropane and mixtures thereof, and from at least one dicarboxylic acid (or at least one dicarboxylic acid derivative thereof) selected from the group consisting of adipic acid, terephthalic acid, isophthalic acid, ortho-phthalic acid, dimethylolpropionoic acid, and mixtures thereof. Preference is given to using at least one such polyester polyol with at least one crosslinking agent (A2), more particularly with at least one polyisocyanate such as HDI or IPDI, for preparing the polyurethane resin which is encompassed by the binder (A).

In order to allow dissolution or dispersion of a polyurethane resin and/or polyurea resin of this kind in water, ionic and/or hydrophilic segments are typically incorporated into the polyurethane chain or polyurea chain, respectively, in order to stabilize the dispersion. As soft segments in the case of polyurethanes it is possible to use preferably 20 to 100 mol % of relatively high molecular mass diols, based on the amount of all diols, preferably polyester diols, having a number-average molecular weight $M_n$ of 500 to 5000 g/mol, preferably of 1000 to 3000 g/mol. The number-average molecular weight is determined in accordance with the method described hereinafter.

Where the binder (A) comprises at least one polyester as polymeric resin (A1), it is possible to use as polyester component the polyester polyols stated in connection with the preparation of the polyurethane resins.

Where the binder (A) comprises at least one poly(meth)acrylate-based polymeric resin as polymeric resin (A1), then suitability for their preparation is possessed in particular by monomer mixtures or oligomer mixtures of esters such as $C_{1-6}$ alkyl esters of acrylic acid and/or of methacrylic acid. The polymer is built up via the reaction of the C—C double bonds of these monomers. Poly(meth)acrylate-based resins of this kind may be prepared by a radical polymerization, initiated for example by the decomposition of organic peroxides.

Where the binder (A) comprises at least one poly(meth)acrylate-based polymeric resin as polymeric resin (A1), particular suitability is possessed by those poly(meth)acrylate-based polymeric resins which may be prepared by multistage radical emulsion polymerization of olefinically unsaturated monomers in water. Particularly preferred are poly(meth)acrylate-based polymeric resins which are preparable by i. polymerizing a mixture of olefinically unsaturated monomers A by emulsion polymerization in water, using an emulsifier and a water-soluble initiator,
ii. polymerizing a mixture of olefinically unsaturated monomers B by emulsion polymerization in water, using an emulsifier and a water-soluble initiator, in the presence of the polymer obtained under i., this mixture of olefinically unsaturated monomers B preferably comprising at least one polyolefinically unsaturated monomer,
iii. polymerizing a mixture of olefinically unsaturated monomers C by emulsion polymerization in water, using an emulsifier and a water-soluble initiator, in the presence of the polymer obtained under ii.

Suitable olefinically unsaturated monomers may be mono- or polyolefinically unsaturated. Examples of suitable monoolefinically unsaturated monomers are, in particular, (meth)acrylate-based monoolefinically unsaturated monomers such as, for example, (meth)acrylic acid and esters, nitriles, or amides of (meth)acrylic acid. Examples of suitable polyolefinically unsaturated monomers are esters of (meth)acrylic acid with an olefinically unsaturated radical. This radical may be an allyl radical or a (meth)acryloyl radical. Preferred polyolefinically unsaturated monomers include ethylene glycol di(meth)acrylate, 1,2-propylene glycol di(meth)acrylate, 2,2-propylene glycol di(meth)acrylate, butane-1,4-diol di(meth)acrylate, neopentyl glycol di(meth)acrylate, 3-methylpentanediol di(meth)acrylate, diethylene glycol di(meth)acrylate, triethylene glycol di(meth)acrylate, tetraethylene glycol di(meth)acrylate, dipropylene glycol di(meth)acrylate, tripropylene glycol di(meth)acrylate, hexanediol di(meth)acrylate, and allyl (meth)acrylate. The monomer mixture A preferably comprises at least one monounsaturated ester of (meth)acrylic acid with an unsubstituted alkyl radical, and optionally, in addition, at least one vinylically monounsaturated monomer having an aromatic radical on the vinyl group. The monomer mixture B preferably comprises at least one polyolefinically unsaturated monomer, at least one monounsaturated ester of (meth)acrylic acid having an unsubstituted alkyl radical, and optionally at least one vinylically monounsaturated monomer having an aromatic radical on the vinyl group. The monomer mixture C preferably comprises at least one alpha-beta unsaturated carboxylic acid, at least one monounsaturated ester of (meth)acrylic acid having an alkyl radical substituted by one or more hydroxyl groups, at least one monounsaturated ester of (meth)acrylic acid with an unsubstituted alkyl radical, and optionally at least one vinylically monounsaturated monomer with an aromatic radical on the vinyl group.

Where the binder (A) comprises not only at least one polymeric resin (A1) but also at least one crosslinking agent (A2), suitability therefor is possessed by all customary crosslinking agents known to the skilled person, such as, for example, aminoplastic resins, phenoplastic resins, polyfunctional Mannich bases, melamine resins, Benzoguanamine resins, beta-hydroxyalkylamides, tris(alkoxycarbonylamino)triazines, epoxides, free polyisocyanates and/or blocked polyisocyanates, more particularly blocked polyisocyanates, and also compounds having on average at least two groups capable of transesterification, examples being reaction products of malonic diesters and polyisocyanates or of esters and partial esters of polyhydric alcohols of malonic acid with monoisocyanates. One particularly preferred crosslinking agent is a blocked polyisocyanate. Where blocked polyisocyanates are selected as crosslinking agents, the aqueous coating composition of the invention is formulated preferably as a 1-component (1-K) composition. Where nonblocked polyisocyanates are selected as crosslinking agents, the aqueous coating composition of the invention is formulated preferably as a 2-component (2-K) composition.

Possible for use with particular preference as crosslinking agents (A2) are water-soluble or water-dispersible melamine resins, preferably melamine-formaldehyde condensation products, more particularly etherified melamine-formaldehyde condensation products. Their water solubility or water dispersibility is dependent—leaving aside the degree of condensation, which is to be as low as possible—on the etherifying component, with only the lowest members of the alkanol or ethylene glycol monoether series producing water-soluble condensates. The greatest importance is possessed by the melamine resins that are etherified with methanol (methylated). When solubilizers are used as optional further additives, it is also possible for ethanol-, propanol- and/or butanol-etherified melamine resins, more particularly the corresponding etherified melamine-formaldehyde condensation products, to be dispersed or dissolved in aqueous phase.

Isocyanates used are preferably (hetero)aliphatic, (hetero)cycloaliphatic, (hetero)aromatic or (hetero)aliphatic-(hetero)aromatic isocyanates. Preferred diisocyanates are those containing 2 to 36, more particularly 6 to 15, carbon atoms. Preferred examples are 1,2-ethylene diisocyanate, 1,4-tetramethylene diisocyanate, 1,6-hexamethylene diisocyanate (HDI), 2,2,4-(2,4,4)-trimethyl-1,6-hexamethylene diisocyanate (TMDI), diphenylmethane diisocyanate (MDI), 1,9-diisocyanato-5-methylnonane, 1,8-diisocyanato-2,4-dimethyloctane, 1,12-dodecane diisocyanate, ω,ω'-diisocyanatodipropyl ether, cyclobutene 1,3-diisocyanate, cyclohexane 1,3- and 1,4-diisocyanate, 3-isocyanatomethyl-3,5,5-trimethyl-cyclohexyl isocyanate (isophorone diisocyanate, IPDI), 1,4-diisocyanatomethyl-2,3,5,6-tetramethylcyclohexane, decahydro-8-methyl-(1,4-methanonaphthalene-2 (or 3), 5-ylenedimethylene diisocyanate, Hexahydro-4,7-methanoindane-1 (or 2), 5 (or 6) ylenedimethylene diisocyanate, hexahydro-4,7-methanoindane-1 (or 2), 5 (or 6) ylene diisocyanate, 2,4- and/or 2,6-hexahydrotolylene diisocyanate (H6-TDI), 2,4- and/or 2,6-toluene diisocyanate (TDI), perhydro-2,4'-diphenylmethane diisocyanate, perhydro-4,4'-diphenylmethane diisocyanate ($H_{12}MDI$), 4,4'-diisocyanato-3,3',5,5'-tetramethyldicyclohexylmethane, 4,4'-diisocyanato-2,2',3,3',5,5',6,6'-octamethyldicyclo-hexylmethane, ω,ω'-diisocyanato-1,4-diethylbenzene, 1,4-diisocyanatomethyl-2,3,5,6-tetramethylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diisocyanatomethylcyclohexane, tetramethylxylylene diisocyanate (TMXDI), 2,5(2,6)-bis(isocyanatomethyl)bicyclo[2.2.1]heptane (NBDI), and also any mixture of these compounds. Polyisocyanates of higher isocyanate functionality may also be used. Examples thereof are trimerized hexamethylene diisocyanate and trimerized isophorone diisocyanate. Furthermore, mixtures of polyisocyanates may also be utilized. The organic polyisocyanates contemplated as crosslinking agents (A2) in the invention may also be prepolymers, which derive, for example, from a polyol, including a polyether polyol or a polyester polyol. As blocked polyisocyanates it is possible to utilize any desired isocyanates wherein the isocyanate groups have been reacted with a compound, so that the blocked polyisocyanate formed is stable in particular with respect to hydroxyl and amino groups, such as primary and/or secondary amino groups, at room temperature, i.e., at a temperature of 18 to 23° C., but undergoes reaction at elevated temperatures, as for example at ≥80° C., more preferably ≥110° C., very preferably ≥130° C., and especially preferably ≥140° C., or at 90° C. to 300° C. or at 100 to 250° C., more preferably still at 125 to 250° C., and very preferably at 150 to 250° C. For the blocking of the isocyanates it is possible with preference to use any desired suitable aliphatic, cycloaliphatic, or aromatic alkyl monoalcohols. Examples of such are aliphatic alcohols, such as methyl, ethyl, chloroethyl, propyl, butyl, amyl, hexyl, heptyl, octyl, nonyl, 3,3,5-trimethylhexyl, decyl, and lauryl alcohol; cycloaliphatic alcohols, such as cyclopentanol and cyclohexanol; aromatic alkyl alcohols, such as phenyl carbinol and methylphenyl carbinol. Other suitable blocking agents are hydroxylamines, such as ethanolamine, oximes, such as methyl ethyl ketone oxime, acetone oxime and cyclohexanone oxime, and amines, such as dibutylamine and diisopropylamine.

The aqueous coating composition of the invention comprises preferably as crosslinking agent (A2) at least one optionally alkylated melamine-formaldehyde condensation product, preferably at least one water-soluble or water-dispersible melamine-formaldehyde condensation product, more particularly at least one water-soluble or water-dispersible etherified (alkylated), preferably methylated, melamine-formaldehyde condensation product. Products of these kinds are available commercially, as for example under the designation Resimene® HM 2608.

The crosslinking agent (A2) is preferably a crosslinking agent in dispersion or solution in water. In order to accelerate crosslinking, suitable catalysts may be added to the aqueous coating composition. Such catalysts as well are known to the skilled person.

The aqueous coating composition of the invention comprises the polymeric resin (A1) preferably in an amount in a range from 5 to 40 wt % or from 20 to 40 wt %, more preferably from 5 to 30 wt % or from 20 to 35 wt %, very preferably from 5 to 25 wt % or from 20 to 30 wt %, based in each case on the total weight of the aqueous coating composition.

The aqueous coating composition of the invention preferably comprises the crosslinking agent (A2) in an amount of 5 to 40 wt %, preferably in an amount of 10 to 35 wt %, more preferably in an amount of 15 to 30 wt % based on the total weight of the polymeric resins (A1) in the coating composition. These amount figures are based in each case on the respective solids content.

The aqueous coating composition preferably comprises the crosslinking agent (A2) in an amount of 0.1 to 20 wt %, preferably in an amount of 0.5 to 15 wt %, more preferably in an amount of 1 to 10 wt %, based in each case on the total weight of the aqueous coating composition.

Pigment (B)

The coating composition of the invention comprises at least one pigment (B).

Pigment (B) is preferably in the form of a pigment (B) in dispersion or solution in water.

Suitable pigments (B) are, in particular, organic and/or inorganic, coloring and/or extending pigments, and more particularly pigments which have preferably at least two of these properties.

In one preferred embodiment, the pigment (B) is an effect pigment or a mixture of at least one effect pigment and at least one pigment different therefrom and not itself an effect pigment and selected preferably from the group consisting of organic and inorganic, coloring and extending pigments and also pigments which have preferably at least two of these properties.

The skilled person is familiar with the concept of effect pigments. A corresponding definition is found in, for example, Römpp Lexikon Lacke und Druckfarben, Georg Thieme Verlag, 1998. Effect pigments are preferably pigments which impart optical effect or color and optical effect, more particularly optical effect. A corresponding classification of the pigments is made in accordance with DIN 55945 (Date: December 2011).

The pigment (B) is preferably selected from the group consisting of uncoated or coated organic and inorganic effect pigments.

The pigment (B) more preferably is selected from the group consisting of uncoated or coated metallic effect pigments, uncoated or coated metal oxide effect pigments, uncoated or coated effect pigments composed of metals and nonmetals, and uncoated or coated nonmetallic effect pigments.

Very preferably the pigment (B) is selected from the group consisting of metallic effect pigments, silicate-coated metallic effect pigments, and uncoated or coated nonmetallic effect pigments such as pearlescent pigments, especially mica pigments. With particular preference the pigment (B) is selected from the group consisting of metallic effect pigments and silicate-coated metallic effect pigments.

Examples of preferred metallic effect pigments are aluminum effect pigments, iron effect pigments, or copper effect pigments. Very preferred are uncoated or coated—such as silanized and/or chromated, for example—aluminum effect pigments, more particularly commercially available products from Eckart such as Stapa® Hydrolac, Stapa® Hydroxal, Stapa® Hydrolux, and Stapa® Hydrolan, most preferably Stapa® Hydrolux and Stapa® Hydrolan.

The effect pigments (B) used in accordance with the invention may be present here in any customary form known to the skilled person, such as a leaflet form and/or a platelet form, for example, more particularly a (corn)flake form or a silver dollar form.

Examples of effect pigments composed of metals and nonmetals are aluminum pigments coated with iron oxide, as are described in European patent application EP 0 562 329 A2, for example, glass leaflets coated with metals, more particularly aluminum, or interference pigments which include a reflector layer made of metal, more particularly aluminum.

Examples of nonmetallic effect pigments are pearlescent pigments, more particularly mica pigments, graphite pigments in, for example, platelet form and coated with metal oxides, interference pigments which contain no metal reflector layer and exhibit a strong color flop, and effect pigments based on iron oxide, or organic liquid-crystalline effect pigments.

For further information regarding the effect pigments used preferably in accordance with the invention as pigment (B), reference is made to Römpp Lexikon Lacke und Druckfarben, Georg Thieme Verlag, 1998, page 176, "Effect pigments" and pages 380 and 381, "Metal oxide-mica pigments" to "metal pigments".

Pigments which are suitable as pigment (B) but are not effect pigments are preferably selected from the group consisting of organic and inorganic, coloring and extending pigments, pigments which have preferably at least two of these properties, and nanoparticles. Examples of suitable inorganic coloring pigments are white pigments such as titanium dioxide, zinc white, zinc sulfide, or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt and manganese violet, red iron oxide, cadmium sulfoselenide, molybdate red, or ultramarine red; brown iron oxide, mixed brown, spinel phases and corundum phases, or chromium orange; or yellow iron oxide, nickel titanium yellow, chromium titanium yellow, cadmium sulfide, cadmium zinc sulfide, chromium yellow, or bismuth vanadate. Examples of suitable organic coloring pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black. Examples of suitable extending pigments or fillers are chalk, calcium sulfate, barium sulfate, silicates such as talc or kaolin, silicas, oxides such as aluminum hydroxide or magnesium hydroxide, or organic fillers such as textile fibers, cellulose fibers, polyethylene fibers, or polymer powders; for further details, reference is made to Römpp Lexikon Lacke und Druckfarben, Georg Thieme Verlag, 1998, pages 250 ff., "Fillers". The nanoparticles are preferably selected from the group consisting of main group and transition group metals and their compounds. The main and transition group metals are preferably selected from metals of main groups 3 to 5, and transition groups 3 to 6 and 1 and 2, of the Periodic Table of the Elements, and also from the lanthanides. Particular preference is given to using boron, aluminum, gallium, silicon, germanium, tin, arsenic, antimony, silver, zinc, titanium, zirconium, hafnium, vanadium, niobium, tantalum, molybdenum, tungsten, and cerium, more particularly aluminum, silicon, silver, cerium, titanium, and zirconium. The compounds of the metals are preferably the oxides, oxide hydrates, sulfates, or phosphates. Preference is given to using silver, silicon dioxide, aluminum oxide, aluminum oxide hydrate, titanium dioxide, zirconium oxide, cerium oxide, and mixtures thereof, more preferably silver, cerium oxide, silicon dioxide, aluminum oxide hydrate, and mixtures thereof, very preferably aluminum oxide hydrate and especially boehmite. These nanoparticles preferably have an average primary particle size <50 nm, more preferably 5 to 50 nm, more particularly 10 to 30 nm. This primary particle size is determined preferably by means of laser diffraction, more preferably by means of laser granulometry in accordance with ISO 13320-1 (Date: September 2009).

The amount of the pigment (B) used in accordance with the invention in the coating composition of the invention may vary very widely according to the intended use of the pigmented coating composition in question. The amount of pigment (B), based on the coating composition of the invention, is preferably 0.1 to 25 wt %, more preferably 1.0 to 20 wt %, very preferably 1.5 to 18 wt %, especially preferably 2 to 15 wt %, and more particularly 2.0 to 8 wt %.

Use of the Mixture (M) as Rheological Assistant

A further subject of the present invention is a use of the mixture (M) used in accordance with the invention for preparing the coating composition of the invention, and composed of at least one polymeric resin (P1) and at least one polymeric resin (P2), different therefrom, where the polymeric resin (P1) is a polyamide which has an acid number <10 mg of KOH per g of polyamide and the polymeric resin (P2) is a polyester which is at least obtainable by reaction of at least one polymerized aliphatic $C_{12}$-$C_{24}$ monocarboxylic acid with at least one diol and/or polyol, as a rheological assistant in aqueous coating compositions.

"Rheological assistant" in the sense of the present invention refers preferably to rheological assistants selected from the group consisting of thixotropic agents, thickening agents, and flow control assistants, and mixtures thereof, more preferably thickening agents.

The mixture (M) used in accordance with the invention is obtainable preferably by dispersing of the polymeric resin (P1) in water or an aqueous medium in the presence of the polymeric resin (P2).

All preferred embodiments described hereinabove in connection with the mixture (M) used in accordance with the invention are also preferred embodiments in relation to the use of the mixture (M), used in accordance with the invention for preparing the coating composition of the invention, especially in relation to the polymeric resins (P1) and (P2).

Optional Component (D)

The coating composition of the invention may optionally comprise at least one further component (D). Suitable with preference as component (D) is a thickener, preferably a thickener which is different from the polymeric resin (P1). Moreover, the optional component (D) is also different from the polymeric resin (P2). Two or more components (D) different from one another may also be used. The optional component (D) is preferably selected from the group consisting of metal silicates, thickeners based on poly(meth) acrylic acid, thickeners based on polyurethanes, polymeric waxes, and mixtures thereof.

The metal silicate is selected preferably from the group of the smectites. With particular preference the smectites are selected from the group of the montmorillonites and hectorites. In particular, the montmorillonites and hectorites are selected from the group consisting of aluminum magnesium silicates and also sodium magnesium phyllosilicates and sodium magnesium fluorine lithium phyllosilicates. These inorganic phyllosilicates are sold under the brand name Laponite®.

Thickeners based on poly(meth)acrylic acid are optionally crosslinked and/or neutralized with a suitable base. Examples of such thickeners based on poly(meth)acrylic acid are "Alkali Swellable Emulsions" (ASE), and hydrophobically modified variants thereof, the "Hydrophobically modified Alkali Swellable Emulsions" (HASE). Thickeners based on poly(meth)acrylic acid are preferably anionic. Corresponding products such as Rheovis® AS 1130 are available commercially.

Thickeners based on polyurethanes (e.g., polyurethane associative thickeners) are optionally crosslinked and/or neutralized with a suitable base. Corresponding products such as Rheovis® PU 1250 are available commercially.

Examples of suitable polymeric waxes include optionally modified polymeric waxes based on ethylene-vinyl acetate copolymers. Corresponding products are commercially available, for example, under the Aquatix® name.

Where the coating composition of the invention includes at least one component (D), the relative weight ratio of the polymeric resin (P1) in the coating composition of the invention to the further component (D) is preferably in a range from 15:1 to 1:15, more preferably in a range from 5:1 to 1:5, very preferably in a range from 5:1 to 1.5:1. All figures are based on the solids content of the components.

Where component (D) is a metal silicate, the relative weight ratio of the polymeric resin (P1) in the coating composition of the invention to component (D) is preferably in a range from 7.5:1 to 1.2:1, more preferably in a range from 5:1 to 1.5:1. Where component (D) is a thickener based on poly(meth)acrylic acid, the relative weight ratio of the polymeric resin (P1) in the coating composition of the invention to component (D) is preferably in a range from 5:1 to 1.5:1, more preferably in a range from 4:1 to 2:1. Where component (D) is a thickener based on polyurethanes, the relative weight ratio of the polymeric resin (P1) in the coating composition of the invention to component (D) is preferably in a range from 4:1 to 1.2:1, more preferably in a range from 3:1 to 1.5:1. All figures are based on the solids content of the components.

The at least one component (D) is preferably present in the coating composition of the invention in an amount of at most 5 wt %, more preferably of at most 2.5 wt %, very preferably of at most 1.5 wt %, more particularly of at most 1.0 wt %, most preferably of at most 0.75 wt %, based in each case on the total weight of the coating composition.

Optional Component (E)

The coating composition of the invention may comprise one or more typically employed additives as component (E), depending on the desired application. These additives (E) are preferably selected from the group consisting of antioxidants, antistats, wetting agents, dispersants, flow control assistants, solubilizers, defoaming agents, wetters, stabilizing agents, preferably heat stabilizers, in-process stabilizers, and UV and/or light stabilizers, photoprotectants, deaerating agents, inhibitors, catalysts, flexibilizers, flame retardants, reactive diluents, carrier media, hydrophobizing agents, hydrophilizing agents, impact tougheners, expandants, process aids, plasticizers, and mixtures of the aforementioned further additives. The amount of additive (E) in the coating composition of the invention may vary. The amount, based on the total weight of the coating composition of the invention, is preferably 0.01 to 20.0 wt %, more preferably 0.05 to 18.0 wt %, very preferably 0.1 to 16.0 wt %, especially preferably 0.1 to 14.0 wt %, more particularly 0.1 to 12.0 wt %, and most preferably 0.1 to 10.0 wt %.

The coating composition of the invention may be prepared by mixing and dispersing and/or dissolving the respective components as described above in a water-based medium, by means of high-speed stirrers, stirred tanks, agitator mills, dissolvers, kneading devices, or inline dissolvers, for example, optionally with further addition of water.

Use

A further subject of the present invention is a use of the coating composition of the invention for at least partly coating an optionally coated substrate with a basecoat film.

Examples of suitable substrates are articles for coating that are made of metal or plastic, such as vehicle bodies produced therefrom, and parts thereof, of motor vehicles such as automobiles, trucks, motorcycles, and buses, and parts produced from metal or plastic of household electrical products.

Method, Basecoat Film, and Substrate

A further subject of the present invention is a method for at least partly coating an optionally coated substrate with a basecoat film, comprising at least one step (a):

(a) at least partly coating at least one optionally coated substrate with a basecoat film with the aqueous coating composition of the invention.

Step (a) is accomplished here by at least partly contacting the substrate with the coating composition of the invention.

Step (a) may optionally be followed by a further step (b), specifically the application of a further film, preferably a clearcoat film, to the basecoat film applied by step (a). In that case the method of the invention is a method leading to a multicoat paint system.

A further subject of the present invention is a basecoat film which is obtainable by at least partial coating of at least one optionally coated substrate with the aqueous coating composition of the invention, or which is obtainable by the method of the invention.

A further subject of the present invention is a substrate coated at least partly with the aqueous coating composition of the invention or with the basecoat film of the invention.

The coating composition of the invention may be applied in this case directly or after the preceding at least partial application of a basecoating composition (priming coat) and where necessary after the at least partial application of a further coating composition such as a primer-surfacer coat to the priming coat, to the objects that are to be coated. This is followed preferably by curing of these coating films. The coating composition of the invention is preferably applied as a finish to automobile bodies and parts thereof. The metallic objects to be coated are subjected beforehand preferably to a chemical treatment with phosphates and chromates, preferably phosphates such as metal phosphates, more particularly zinc phosphates.

The coating composition of the invention can be coated onto these target substrates by electrostatic coating, by air spray coating, and by airless spray coating. The thickness of the resultant coating film falls preferably within a range from 5 to 35 μm, more particularly 10 to 25 μm, as cured coating film. The coating film can be dried, for example, by heating at 50 to 100° C. (oven temperature) for 2 to 40 minutes, preferably 5 to 20 minutes.

A clear coating composition may be coated onto the coating film of the coating composition of the invention, following the curing or without the curing of the latter, i.e., onto a coated side thereof, by a "twice coat once cure" (2 coat 1 bake (2C1B)) process or by a "twice coat twice cure" (2 coat 2 bake (2C2B)) process.

The clear coating composition for applying a clearcoat material of this kind can be applied by firstly applying the coating composition of the invention to the target substrate in the manner described above and by applying the clear coating composition, with a solids content in the coating composition that is controlled at preferably 30 to 80 wt %, to a coated surface thereof by electrostatic coating, by air spray coating, and by airless spray coating, after the curing of a coating film thereof by heating, or in the uncured state. The film thickness of the clear coating composition falls preferably within a range of commonly 5 to 100 μm, more particularly 20 to 80 μm, based on the cured coating film. The entire coating film may be cured by heating at 100 to 180° C. for 10 to 40 minutes.

Methods of Determination

1. Assessing the Incidence of Pops and Runs

To determine the popping and running propensity of an inventive coating composition (or of a comparative coating composition), multicoat paint systems are produced, along the lines of DIN EN ISO 28199-1 (Date: January 2010) and DIN EN ISO 28199-3 (Date: January 2010), in accordance with the following general procedure:

A perforated steel sheet measuring 57 cm×20 cm (as per DIN EN ISO 28199-1, section 8.1, version A) and coated with a standard priming coat is coated with an aqueous standard primer-surfacer (SecuBloc® from BASF Coatings GmbH) to a target film thickness (dry film thickness) of 25-35 μm. After 5-10 minutes of flashing at 18-23° C. and after interim drying of the primer-surfacer over a period of 10 minutes at 70° C., it is baked at a temperature of 150° C. over a period of 10 minutes. Following DIN EN ISO 28199-1, section 8.2, the coated steel panels thus obtained are coated electrostatically in wedge format (i.e., by means of wedge application) at different film thicknesses in the range from 0 μm to 30 μm with an inventive coating composition or a comparative coating composition as waterborne basecoat material. The resulting waterborne basecoat film is flashed at 18-23° C. for a time of 4 minutes and 30 seconds and subsequently dried in a forced air oven at 70° C. for 5 minutes. In the case of the test for runs, the panels are flashed and dried in a standing perpendicular position. Applied atop the dried waterborne basecoat film is a commercial two-component clearcoat (ProGloss® from BASF Coatings GmbH) to a target film thickness (dry film thickness) of 40-45 μm. The resulting clearcoat film is flashed at 18-23° C. for a time of 7 minutes. This is followed by curing in a forced air oven at 140° C. for a time of 22 minutes.

The popping limit, i.e., the basecoat film thickness at which pops initially occur, is determined according to DIN EN ISO 28199-3, section 5. The running propensity is determined according to DIN EN ISO 28199-3, section 4. As well as the film thickness at which a run exceeds the length of 10 mm, starting from the bottom edge of the perforation, a determination is made of the film thickness from which a first running propensity at a perforation is visually observable.

The respective film thicknesses are determined according to DIN EN ISO 2808 (Date: May 2007), method 12A (using the ElekroPhysik MiniTest® 3100-4100 instrument).

2. Determining the Leveling after Condensation Water Treatment

The leveling or waviness of the coated substrates is assessed using a Byk/Gardner Wave Scan instrument. The coated substrates are produced as described hereinafter: Atop a metallic substrate measuring 10×20 cm, and coated with a cured standard priming coat, an inventive coating composition or a comparative coating composition as waterborne basecoat material is applied pneumatically to a target dry film thickness of 12-14 μm. Subsequently, after a flashing time at room temperature of 5 minutes, the resulting waterborne basecoat film is dried in a forced air oven at 80° C. for 10 minutes. Applied atop the dried waterborne basecoat film is a commercial two-component clearcoat (ProGloss from BASF Coatings GmbH) to a target film thickness of 40-45 μm. The resulting clearcoat film is flashed at room temperature for 10 minutes, followed by curing in a forced air oven at 140° C. for a further 20 minutes. To assess the leveling or waviness of the coated substrates, a laser beam is directed at an angle of 60° onto the surface under investigation, and the instrument records the fluctuations in the reflected light over a distance of 10 cm in the shortwave region (0.3 to 1.2 mm) and in the longwave region (1.2 to 12 mm) (longwave=LW; shortwave=SW; the lower the values, the better the appearance). These measurements are carried out before and after condensation water exposure. For this exposure, the coated substrates are stored over a period of 10 days in a conditioning chamber under test conditions CH to DIN EN ISO 6270-2 (Date: September 2005). 24 hours after removal from the conditioning chamber, the coated substrates are then investigated visually for blistering, and the leveling or waviness is assessed.

3. Determining Cloudiness

The cloudiness of a coating system is understood according to DIN EN ISO 4618 (Date: March 2007) to refer to the nonuniform appearance of a coating, caused by irregular regions distributed randomly over the surface, these regions differing in color and/or gloss. A patchlike inhomogeneity of this kind disrupts the overall uniform impression given by the coating, and is generally unwanted. The unwanted cloudiness of the coating may be a consequence, for example, of the properties of the coating composition employed.

For determining and assessing the cloudiness, multicoat paint systems are produced in accordance with the following general procedure:

A steel panel measuring 32 cm×60 cm and coated with a standard primer-surfacer finish (SecuBloc® from BASF Coatings GmbH) is coated with an inventive coating composition or a comparative coating composition as waterborne basecoat material by means of twofold application: application in the first step takes place electrostatically to a target film thickness (dry film thickness) of 8-9 µm, and in the second step, following a 2-minute flashing time at 18-23° C., application takes place pneumatically to a target film thickness of 4-5 µm (dry film thickness). Subsequently, after further flashing time at 18-23° C. over a period of 5 minutes, the resulting waterborne basecoat film is dried in a forced air oven at 80° C. for 5 minutes. Applied atop the dried waterborne basecoat film is a commercial two-component clearcoat (ProGloss® from BASF Coatings GmbH) to a target film thickness (dry film thickness) of 40-45 µm. The resulting clearcoat film is flashed at 18-23° C. for 10 minutes. This is followed by curing in a forced air oven at 140° C. for 20 minutes.

The cloudiness is assessed visually under defined light conditions and observation geometries. The cloudiness here is evaluated according to a scale of ratings (rating 1=no perceptible cloudiness, to rating 5=severe cloudiness visible). For this assessment, the coatings in question are viewed under diffuse light at two different angles from a distance of 2 to 3 meters (a) straight-on view: viewing angle is about 80°, and (b) oblique view: viewing angle is about 40).

4. Determining the Film Thickness-Dependent Leveling

To determine and assess the film thickness-dependent leveling, wedge coatings of the inventive coating compositions or comparative coating compositions as waterborne basecoat materials are produced in accordance with the following general procedure:

A metallic steel panel measuring 32 cm×60 cm and coated with a standard priming coat has two adhesive strips (Tesaband, 19 mm) applied to it over one long edge (in order to be able to ascertain differences in film thickness after coating) and is then coated electrostatically as a wedge (in wedge format) to a film thickness of 0 µm to 30 µm (dry film thickness) with an inventive coating composition or a comparative coating composition as waterborne basecoat material. The resulting waterborne basecoat film is flashed at 18-23° C. for 5 minutes and then dried in a forced air oven at 80° C. for 5 minutes. Following removal of one of the two adhesive strips, a commercial two-component clearcoat (ProGloss® from BASF Coatings GmbH) is applied to the dried waterborne basecoat film to a target film thickness of 40-45 µm (dry film thickness). The resulting clearcoat film is flashed at 18-23° C. for 4 minutes. This is followed by curing in a forced air oven at 140° C. for 20 minutes. Following removal of the second adhesive strip, the dry film thickness of the clearcoat is checked, and for the basecoat wedge the film thickness ranges 10-15 µm, 15-20 µm, 20-25 µm, and 25-30 µm are marked on the steel panel. The respective film thicknesses are determined according to DIN EN ISO 2808 (Date: May 2007), method 12A (using the ElekroPhysik MiniTest® 3100-4100 instrument).

The film thickness-dependent leveling is determined and assessed using the Byk/Gardner Wave scan instrument within the four basecoat film thickness ranges ascertained previously (10-15 µm, 15-20 µm, 20-25 µm, and 25-30 µm). For this purpose, a laser beam is directed at an angle of 60° onto the surface under investigation, and over a distance of 10 cm, the fluctuations in the reflected light are recorded in the shortwave range (0.3 to 1.2 mm) and in the longwave range (1.2 to 12 mm), using the instrument (longwave=LW; shortwave=SW; the lower the values, the better the appearance).

5. Determining Application Efficiency

To determine the application efficiency, multicoat paint systems are produced according to the following general procedure:

A coil panel measuring 100 cm×32 cm and coated with a standard primer-surfacer finish (e.g., SecuBloc® from BASF Coatings GmbH) is provided, in each case at a distance of 8 cm from the long edges, with adhesive strips (Tesaband, 30 mm), in order to be able to determine differences in film thickness after coating. This substrate is coated electrostatically with an inventive coating composition or a comparative coating composition as waterborne basecoat material, by moving an atomizer horizontally over the center of the long side of the coil panel a number of times, from left to right, and so producing a spray pattern, which is used typically by the skilled person for analysis of the SP50% figure. The SP50% figure is understood to be the 50% spray pattern diameter, i.e., the lateral extent of a spray pattern for which the thickness occupies half of the maximum figure. The coating parameters such as flow rate, rotary speed, high voltage, belt speed, etc., are selected here in each case such that the SP50% is approximately 10 cm. After a flashing time at 18-23° C. of 5 minutes, the resulting waterborne basecoat film is dried in a forced air oven at 80° C. for 10 minutes, followed by further drying in a forced air oven at 140° C. for 20 minutes.

In order to determine a characteristic number for the amount of basecoat material deposited, and therefore the application efficiency, the following steps a) to e) are undertaken:

a) measuring the film thicknesses to DIN EN ISO 2808 method 12A ((Date: May 2007), using the ElektroPhysik MiniTest® 3100-4100 instrument) parallel to the long side of the substrate, in a grid of 2 cm at six positions along the transverse side (starting 45 mm, 90 mm, 135 mm, 180 mm, 225 mm, and 270 mm from the left-hand long side of the panel; the grids at 90 mm and 225 mm are the areas previously taped off, which are needed for determining differences in film thickness);

b) determining the four actual basecoat film thickness profiles along the long side of the substrate, by calculating the layer thickness differences in the measurements at 45 mm/90 mm, 135 mm/90 mm, 180 mm/225 mm, and 270 mm/180 mm;

c) calculating an average film thickness profile by forming an average from the four individual film thickness profiles;

d) fitting a curve based on the measurement points of the averaged film thickness profile; and e) determining the integral under this curve as a characteristic value for the amount of basecoat material deposited and hence as a characteristic value for the application efficiency.

The greater the area integral found, the higher and better the application efficiency.

6. Determining the Nonvolatile Fraction

The nonvolatile fraction is determined to DIN EN ISO 3251 (Date: June 2008). Here, 1 g of sample is weighed out into an aluminum dish which has been dried beforehand, and the sample is dried in a drying cabinet at 125° C. for 60 minutes, cooled in a desiccator, and then weighed again. The residue, relative to the total amount of sample employed, corresponds to the nonvolatile fraction. The volume of the nonvolatile fraction may be determined if necessary, where appropriate, to DIN 53219 (Date: August 2009).

7. Determining the Number-Average and Weight-Average Molecular Weights

The number-average molecular weight ($M_n$) is determined by gel permeation chromatography (GPC). This method of determination is along the lines of DIN 55672-1 (Date: August 2007). As well as the number-average molecular weight, this method can also be used to determine the weight-average molecular weight ($M_w$), and also the polydispersity (ratio of weight-average molecular weight ($M_w$) to number-average molecular weight ($M_n$)). Tetrahydrofuran is the eluent used. The determination is made against polystyrene standards. The column material consists of styrene-divinylbenzene copolymers.

8. Determining the Hydroxyl Number (OH Number)

The OH number is determined to DIN 53240-2 (Date: November 2007). Here, the OH groups are reacted by acetylation with an excess of acetic anhydride. The excess acetic anhydride is then cleaved by adding water to form acetic acid, and the entire acetic acid is back-titrated with ethanolic KOH. The OH number indicates the amount of KOH in mg which is equivalent to the amount of acetic acid bound in the acetylation of 1 g of sample.

9. Determining the Stonechip Adhesion

To determine and assess the stonechip adhesion, multicoat paint systems are produced in accordance with the following general procedure:

A metallic substrate such as a steel panel measuring 10 cm×20 cm and coated with a standard priming coat is coated with an inventive coating composition or a comparative coating composition as waterborne basecoat material by means of manual application using a gravity-feed gun (from DeVilbiss, with a 1.1-1.3 mm nozzle and a 797 air gap) to a target film thickness of 16-19 µm (dry film thickness). Subsequently, after a flashing time at 18-23° C. of 5 minutes, the resulting waterborne basecoat film is dried in a forced air oven at 80° C. for 10 minutes. Applied atop the dried waterborne basecoat film is a commercial two-component clearcoat (Evergloss® from BASF Coatings GmbH) to a target film thickness of 40-45 µm (dry film thickness). The resulting clearcoat film is flashed at 18-23° C. for a time of 20 minutes. This is followed by curing in a forced air oven at 140° C. for 20 minutes.

For assessing the stonechip adhesion, the resulting multicoat paint systems are investigated by means of the stonechip test to DIN EN ISO 20567-1, method B (Date: April 2007). The resulting damage pattern is likewise assessed to DIN EN ISO 20567-1.

10. Determining the Acid Number

The acid number is determined to DIN EN ISO 2114 (Date: June 2002), using "method A". The acid number corresponds to the mass of potassium hydroxide in mg which is needed to neutralize 1 g of sample under the conditions specified in DIN EN ISO 2114.

11. Assessment of the Incidence of Pinholes

To assess the incidence of pinholes, an inventive coating composition (or a comparative coating composition) is applied in single application as waterborne basecoat material to a steel panel which measures 32×60 cm and has been coated with a primer-surfacer coat. Beforehand, the steel panel is provided at one long edge with two adhesive strips (Tesaband, 19 mm) in order to allow differences in film thickness to be determined after coating. The waterborne basecoat material is then applied electrostatically with a dry film thickness of 16-19 µm. The resulting waterborne basecoat film, after a flashing time at room temperature (18 to 23° C.) of 5 minutes, is then dried in a forced air oven at 80° C. for 10 minutes. Following removal of one of the two adhesive strips, a commercial two-component clearcoat (Evergloss® from BASF Coatings GmbH) is applied manually in wedge format with a dry film thickness of 0-55 µm to the dried waterborne basecoat film, using a gravity-feed gun. The resulting clearcoat film is flashed at room temperature (18 to 23° C.) for 10 minutes, followed by curing in a forced air oven at 140° C. for a further 20 minutes. Following removal of the second adhesive strip, the dry film thickness of the waterborne basecoat is checked, and for the clearcoat wedge the film thickness ranges 20-30 µm, 30-40 µm, and 40-50 µm are marked on the steel panel. The respective film thicknesses are determined here in accordance with DIN EN ISO 2808 (Date: May 2007), method 12A (using, for example, the ElectroPhysik MiniTest 3100-4100 instrument).

Pinholes are evaluated visually in the three separate clearcoat dry film thickness ranges (20-30 µm, 30-40 µm, and 40-50 µm). For each range, the number of pinholes is counted. All of the results are standardized to an area of 200 cm². A record is additionally made, where appropriate, of the clearcoat dry film thickness from which pinholes no longer occur.

12. Determining the Storage Stability of Inventive or Comparative Coating Compositions To determine the storage stability of the inventive coating compositions (or of comparative coating compositions), they are investigated, before and after two-week storage at 40° C., with a rotary viscometer conforming to DIN 53019-1 (Date: September 2008) and calibrated to DIN 53019-2 (Date: February 2001), under standardized conditions (23.0° C.±0.2° C.). In this investigation, the samples are first of all subjected to primary shearing at a shearing rate of 100 s$^{-1}$ for 3 minutes. This is followed by temperature conditioning without a shearing load. For the measurement of what is called a flow curve, a shear rate range from 0.1 s$^{-1}$ to 1000 s$^{-1}$ is traversed over the course of about 5 minutes (upward curve). This is followed by shearing at 1000 s$^{-1}$ for a minute (holding time), after which a shear rate range of 1000 s$^{-1}$ to 0.1 s$^{-1}$ is traversed, again within about 5 minutes (downward curve). 36 measurement points are captured during the upward and downward curves, and 10 during the holding time. The average viscosity level during the holding time (high-shear viscosity) and also the viscosity level at 1 s$^{-1}$ (low-shear viscosity), determined from the downward curve, are ascertained from the measurement data, and the figures before and after storage are compared with one another.

13. Assessing the Incidence of Bits from Inventive or Comparative Coating Compositions In order to assess the incidence of bits, an inventive coating composition (or a comparative coating composition) is applied as waterborne basecoat material, by means of twofold application, to a steel panel measuring 32×60 cm and coated with a primer-surfacer coat, application taking place in the first step electrostatically with a dry film thickness of 8-9 µm, and application taking place in the second step pneumatically, after a 2-minute flashing time at room temperature (18 to 23° C.), with a dry film thickness of 4-5 µm. Subsequently, after a further flashing time at room temperature of 5 minutes, the resulting waterborne basecoat film is dried in a forced air oven at 80° C. for 5 minutes. Applied atop the dried waterborne basecoat film is a commercial two-component clearcoat (ProGloss® from BASF Coatings GmbH) with a dry film thickness of 40-45 µm. The resulting clearcoat film is flashed at room temperature (18 to 23° C.) over a time of 10 minutes. This is followed by curing in a forced air oven at 140° C. for a further 20 minutes.

Bits are evaluated visually, and a rating of 1-5 is awarded (1=no bits/5=very many bits).

14. Assessment of the Incidence of Bits on Application of the Inventively Employed Aqueous Dispersions or Comparative Dispersions to a Substrate For the purpose of assessing the incidence of bits, the dispersions are investigated according to the following general procedure:

The respective dispersion is applied, using a 150 µm four-way bar applicator, to a glass panel measuring 9 cm×15 cm. In the wet state, the film thus formed, after a 60-minute flashing time at 18 to 23° C., is assessed visually for the incidence of bits, by holding it against a light source, so as not to misinterpret as bits any inclusions of air. A rating of 1-5 is awarded (1=no bits/5=very many bits).

15. Assessment of Homogeneity and Water-Miscibility

For the assessment of the homogeneity and water-miscibility, the inventively employed aqueous dispersions (or comparative dispersions) are investigated in accordance with the following general procedure:

a) homogeneity: an assessment is made of whether the individual components used in preparing the dispersion can be combined into a macroscopically single-phase mixture (homogeneous mixture), or whether, for example, two or more phases are formed as a result of separation, either during weighing out itself or within 5 to 10 minutes after stirring together of the components.

b) Water-miscibility: an assessment is made of the extent to which deionized water, as the last component used in preparing the dispersion, can be mixed with the other constituents of the dispersion. One measure for this purpose in particular is the amount of shearing energy which is needed during mixing.

In each case, ratings of 1-5 are awarded (1=very homogeneous/5=very inhomogeneous and 1=very water-miscible/5=not water-miscible).

The inventive and comparative examples below serve to illustrate the invention, but should not be interpreted as imposing any restriction.

INVENTIVE AND COMPARATIVE EXAMPLES

Unless indicated otherwise, the amounts in parts are by weight and the amounts in percent are by weight in each case.

1. Components Used

The components identified below and used for producing the inventive coating compositions or comparative coating compositions have the following definitions:

Disparlon® A650-20X is a commercially available polyamide from Kusumoto Chemicals, Ltd. (Nonvolatile fraction: 20 wt %).

Disparlon® A670-20M is a commercially available polyamide from Kusumoto Chemicals, Ltd. (Nonvolatile fraction: 20 wt %).

Disparlon® A6900-20X is a commercially available polyamide from Kusumoto Chemicals, Ltd. (Nonvolatile fraction: 20 wt %.

Thixatrol® P220X-MF is a commercially available polyamide from Elementis Specialties, Inc. (Nonvolatile fraction: 20 wt %, acid number: 5 mg KOH/g).

Luvotix® AB is a commercially available polyamide from Lehmann & Voss & Co. (Nonvolatile fraction: 100 wt %; acid number: ≤3 mg KOH/g).

The inventively employed aqueous dispersion of a polyester (I) is prepared as described in example D of DE 40 09 858 A1 (column 16, lines 37-59), but with the difference that butyl glycol rather than butanol was used for the dilution, and has a nonvolatile fraction of 60 wt %. The polyester has an acid number of 30 mg KOH/g polyester.

Polyester A (inventively employed polyester) is prepared by weighing out, into a reactor equipped with a stirrer, a thermometer, and a packed column, 6.13 parts by weight of neopentyl glycol, 3.23 parts by weight of 1,6-hexanediol, 7.78 parts by weight of hexahydrophthalic anhydride, and 29.17 parts by weight of a polymeric fatty acid (dimer content at least 98 wt %, trimer content not more than 2 wt %, monomer content no more than traces) and also 11.07 parts by weight of the commercially available product Bisphenol A 4EO, and this initial charge is caused to melt. It is heated with stirring at a level such that the column overhead temperature does not exceed 95° C. Esterification takes place at not more than 220° C. until an acid number of 8.5 mg KOH/g is reached. The product is cooled to 100° C., 3.33 parts by weight of trimellitic anhydride are added, and esterification continues at not more than 160° C. until an acid number of 30-35 mg KOH/g is reached. After cooling to 90° C. has taken place, 2.8 parts by weight of dimethylethanolamine, 17.28 parts by weight of deionized water, and 19.21 parts by weight of butyl glycol are stirred in slowly. This gives a finely divided dispersion having a pH of 7.3-8.5, a nonvolatile fraction of 60 wt %, and an acid number of 35.3 mg KOH/g and an OH number of 54 mg KOH/g. This dispersion is used as it is as polyester A.

Polyester B (inventively employed polyester) is prepared by weighing out, into a reactor equipped with a stirrer, a thermometer, and a packed column, 6.87 parts by weight of neopentyl glycol, 7.23 parts by weight of 1,6-hexanediol, 5.81 parts by weight of hexahydrophthalic anhydride, and 32.66 parts by weight of a polymeric fatty acid (dimer content at least 98 wt %, trimer content not more than 2 wt %, monomer content no more than traces) and 5.03 parts by weight of dodecenylsuccinic anhydride, and this initial charge is caused to melt. It is heated with stirring at a level such that the column overhead temperature does not exceed 95° C. Esterification takes place at not more than 220° C. until an acid number of 8.5 mg KOH/g is reached. The product is cooled to 100° C., 3.31 parts by weight of trimellitic anhydride are added, and esterification continues at not more than 160° C. until an acid number of 30-35 mg KOH/g is reached. After cooling to 90° C. has taken place, 2.78 parts by weight of dimethylethanolamine, 17.19 parts by weight of deionized water, and 19.12 parts by weight of butyl glycol are stirred in slowly. This gives a finely divided dispersion having a pH of 7.3-8.5, a nonvolatile fraction of 60 wt %, and an acid number of 35.5 mg KOH/g and an OH number of 56 mg KOH/g. This dispersion is used as it is as polyester B.

Polyester C (noninventively employed polyester) is prepared by introducing maleic anhydride (MAn, 2.48 mol), adipic acid (AD, 2.72 mol), and 1,6-hexanediol (HD, 7.01 mol) into a 4-liter stainless steel reactor equipped with a column, a condenser, and a water separator. This was followed by the addition of 3% of xylene as azeotrope former and 0.1% of methylhydroquinone (the percentages are based on the amount of MAn, AD, and HD employed). The resulting reaction mixture was heated under lean air over 5 hours. Throughout the reaction time, the temperature of the reaction mixture did not exceed 230° C. When an acid number of 2 mg KOH/g, based on the oligoester, had been reached, the reaction mixture was cooled to 80° C. Then trimellitic anhydride (TMAn, 0.95 mol) was added in situ. This was followed by slow heating to 160° C., and this temperature was maintained until an acid number of 35 mg KOH/g, based on the resulting oligoester, had been reached. After cooling had again taken place to 80° C., dimethylethanolamine (DMEA, 0.77 mol) was added over a period of 30 minutes. This was followed by the addition of water to set a solids content of 25 wt %, over a period of 30 minutes. The resulting dispersion was stirred at 80° C. for one hour more, and then cooled to 18-23° C. This dispersion is used as it is as polyester C. The alpha,omega-hydroxy-functionalized oligoester present in the dispersion has an OH number of 58 mg KOH/g, an acid number of 35 mg KOH/g, and a number-average molecular weight of 3618 g/mol and a weight-average molecular weight of 25 400 g/mol.

Resimene® HM 2608 is a commercially available melamine-formaldehyde resin from Ineos (nonvolatile fraction: 80-85 wt %).

Lipotin® A is a commercially available wetting agent and dispersant from Evonik Industries AG.

Alu Stapa Hydrolux® 2154, 8154 & VP56450 are commercial aluminum pigments available from Altana-Eckart.

Rheovis® AS 1130 is a commercially available aqueous solution from BASF SE, containing 30 wt % of a thickener based on an acrylic copolymer.

Rheovis® PU 1250 is a commercially available aqueous butyl diglycol solution from BASF SE, containing 40 wt % of a thickener based on a polyurethane.

Pluriol® E300 is a commercially available polyethylene glycol from BASF SE.

Agitan® 282 is a commercially available defoamer from Munzing Chemie GmbH.

Dispex® Ultra FA 4437 is a commercially available flow control assistant, available from BASF SE.

The aqueous dispersion of at least one polymeric resin (I) is prepared as described on page 7, line 55 to page 8, line 23 of DE 44 37 535 A1.

The aqueous dispersion of at least one polymeric resin (II) is a dispersion of a poly(meth)acrylate resin having a nonvolatile fraction of 26-28 wt %.

The aqueous dispersion of a polymeric resin (III) is prepared as described on page 14, line 13 to page 15, line 28 of WO 92/15405 A1 (as example 1.3 therein).

Byketol®-WS is a commercially available surface additive from Altana/BYK-Chemie GmbH.

BYK®-346 is a commercially available, silicone-based surfactant from Altana/BYK-Chemie GmbH.

Isopar® L is an isoparaffin available from Exxon Mobil.

Nacure® 2500 is an amine-blocked acid catalyst available from King Industries, Inc.

The aqueous polyamide dispersion I is an aqueous dispersion containing 31.5 parts by weight of deionized water, 18.5 parts by weight of isobutanol, and 50 parts by weight of the commercially available polyamide Disparlon® AQ600 from Kusumoto Chemicals, Ltd. (Nonvolatile fraction: 20 wt %; acid number: 12.5 mg KOH/g), this acid number being based not on the nonvolatile fraction but on the entire product).

The aqueous polyamide dispersion II is an aqueous dispersion containing 78.5 parts by weight of deionized water, 0.5 part by weight of Agitan® 282, 1 part by weight of 2,4,7,9-tetramethyl-5-decynediol in butyl glycol (52 wt %), and 20 parts by weight of the commercially available polyamide Disparlon® AQ630 from Kusumoto Chemicals, Ltd. (Nonvolatile fraction: 18 wt %; acid number: 12.5 mg KOH/g), this acid number being based not on the nonvolatile fraction but on the entire product).

2. Preparation of Inventively Employed Dispersions of Thickeners 2.1 Preparation of Inventively Employed Dispersions of Thickeners X1 to X3:

Introduced initially are at least one organic solvent and also, optionally, at least one neutralizing agent such as 2,4,7,9-tetramethyl-5-decynediol, for example. The resulting mixture is admixed with stirring and at a temperature of 15-25° C. with at least one of the aforementioned commercially available polyamides. Added to this mixture with stirring, simultaneously or in succession, are an aqueous dispersion of a polyester (I) and deionized water. The resulting mixture is then homogenized over a time of 10 minutes at the temperature stated above, using the Dispermat® LC30 device from VWA-Getzmann, Germany, with stirring, at a peripheral speed of the stirring disk used of 15 to 20 m/s.

In this way, from the components listed in table 1.1 below, the inventively employed dispersions of thickeners X1 to X3 are obtained. The respective quantity figures are in each case wt %, based on the total weight of the respective dispersion.

TABLE 1.1

Preparation of dispersions of thickeners X1, X2, and X3

| Components | X1 | X2 | X3 |
|---|---|---|---|
| Isobutanol | 20.00 | 20.00 | 20.00 |
| Dimethylethanolamine | 1.00 | 1.00 | 1.00 |
| 2,4,7,9-Tetramethyl-5-decynediol in butyl glycol (52 wt %) | 3.00 | 3.00 | 3.00 |
| Disparlon ® A650-20X | 10.00 | — | — |
| Disparlon ® A670-20M | — | 10.00 | — |
| THIXATROL ® P220X-MF | — | — | 10.00 |
| Aqueous dispersion of a polyester (I) | 20.00 | 20.00 | 20.00 |
| Deionized water | 46.00 | 46.00 | 46.00 |
| Fraction of polyamide (wt % solids) | 2% | 2% | 2% |
| Fraction of organic solvents (wt %) | 33.4% | 33.4% | 33.4% |

2.2 Preparation of Inventively Employed Dispersions of Thickeners X4 to X11:

The components listed in table 1.2 below are stirred together in the stated order with stirring at a temperature of 15-25° C. in each case to form a mixture. This mixture is subsequently homogenized with stirring for 10 minutes, in each case at the temperature stated above. Homogenization takes place as described above in section 2.1.

TABLE 1.2

Preparation of dispersions of thickeners X4 to X11

| Components | X4 | X5 | X6 | X7 | X8 | X9 | X10 | X11 |
|---|---|---|---|---|---|---|---|---|
| Resimene ® HM 2608 | 35.86 | 25.85 | 24.20 | 23.46 | 22.75 | 21.47 | 23.53 | 24.13 |
| Dimethylethanolamine | 0.69 | 0.34 | 0.32 | 0.31 | 0.30 | 0.28 | 0.43 | 0.63 |
| Disparlon ® A670-20M | — | 13.61 | 19.11 | 21.60 | 23.95 | 28.25 | 14.35 | 19.05 |
| Luvotix ® AB | 6.90 | — | — | — | — | — | — | — |
| n-Butoxypropanol | — | 11.22 | 10.51 | 10.19 | 9.88 | 9.32 | — | 10.48 |
| 1-Propoxy-2-propanol | — | 14.97 | 14.01 | 13.58 | 13.17 | 12.43 | — | 13.97 |
| Isobutanol | — | 16.33 | 15.29 | 14.81 | 14.37 | 13.56 | — | 15.24 |
| Butyl glycol | 29.66 | — | — | — | — | — | 28.70 | — |
| 2,4,7,9-Tetramethyl-5-decynediol in butyl glycol (52 wt %) | — | — | — | — | — | — | 4.30 | — |
| Aqueous dispersion of a polyester (I) | 26.90 | 17.69 | 16.56 | 16.05 | 15.57 | 14.69 | 28.70 | 16.51 |
| Fraction of polyamide (wt % solids) | 6.9% | 2.7% | 3.8% | 4.3% | 4.8% | 5.6% | 2.9% | 3.8% |
| Fraction of organic solvents (wt %) | 38.8% | 59.6% | 60.9% | 61.5% | 62.1% | 63.1% | 50.4% | 60.7% |

2.3 Preparation of Inventively Employed Dispersions of Thickeners X12 to X13:

The components listed in table 1.3 below are stirred together in the stated order with stirring at a temperature of 15-25° C. in each case to form a mixture. This mixture is subsequently homogenized with stirring for a period of 10 minutes, in each case at the temperature stated above. Homogenization takes place as described above in section 2.1.

TABLE 1.3

Preparation of dispersions of thickeners X12 to X13

| Components | X12 | X13 |
|---|---|---|
| Aqueous dispersion of a polyester (I) | 22.50 | 10.00 |
| Dimethylethanolamine | 0.45 | 0.38 |
| 2,4,7,9-Tetramethyl-5-decynediol in butyl glycol (52 wt %) | 3.00 | 3.00 |
| Lipotin ® A | 3.00 | 2.69 |
| Deionized water | 56.05 | 60.00 |
| Luvotix ® AB | — | 2.69 |
| Disparlon ® A670-20M | 15.00 | — |
| Isobutanol | — | 9.23 |
| Fraction of polyamide (wt % solids) | 3% | 2.69% |
| Fraction of organic solvents (wt %) | 17.9% | 14.4% |

2.4 Preparation of Inventively Employed Dispersions of Thickeners X14 to X19:

The components listed in table 1.4 below are stirred together in the stated order with stirring at a temperature of 15-25° C. in each case to form a mixture. This mixture is subsequently homogenized with stirring for a period of 10 minutes, in each case at the temperature stated above. Homogenization takes place as described above in section 2.1.

TABLE 1.4

Preparation of dispersions of thickeners X14 to X19

| Components | X14 | X15 | X16 | X17 | X18 | X19 |
|---|---|---|---|---|---|---|
| Aqueous dispersion of a polyester (I) | 22.50 | 22.50 | 10.00 | 10.00 | — | — |
| Polyester A | — | — | — | — | 23.60 | — |
| Polyester B | — | — | — | — | — | 23.20 |
| Dimethylethanolamine | 0.45 | 0.45 | 0.30 | 0.30 | 0.45 | 0.45 |
| 2,4,7,9-Tetramethyl-5-decynediol in butyl glycol (52 wt %) | 3.00 | 3.00 | — | — | 3.00 | 3.00 |
| Lipotin ® A | 3.00 | — | — | — | 3.00 | 3.00 |
| Soya lecithin | — | 3.00 | — | — | — | — |
| Lutensol ® ON 60 | — | — | 0.20 | — | — | — |
| Lutensol ® XP 70 | — | — | — | 0.20 | — | — |
| Deionized water | 56.05 | 56.05 | 69.50 | 69.50 | 54.95 | 55.35 |
| Disparlon ® A670-20M | — | 15.00 | 10.00 | 10.00 | 15.00 | 15.00 |
| Troythix ® 250XF | 15.00 | — | — | — | — | — |
| Butyl glycol | — | — | 10.00 | 10.00 | — | — |
| Fraction of polyamide (wt % solids) | 3% | 3% | 2% | 2% | 3% | 3% |

TABLE 1.4-continued

| Preparation of dispersions of thickeners X14 to X19 | | | | | | |
|---|---|---|---|---|---|---|
| | X14 | X15 | X16 | X17 | X18 | X19 |
| Fraction of organic solvents (wt %) | 17.9% | 17.9% | 20.0% | 20.0% | 18.5% | 18.3% |

2.5 Preparation of Inventively Employed Dispersions of Thickeners X20 to X22:

The components listed in table 1.5 below are stirred together in the stated order with stirring at a temperature of 15-25° C. in each case to form a mixture. This mixture is subsequently homogenized with stirring for a period of 10 minutes, in each case at the temperature stated above. Homogenization takes place as described above in section 2.1.

TABLE 1.5

| Preparation of inventively employed dispersions of thickeners X20 to X22 | | | |
|---|---|---|---|
| Components | X20 | X21 | X22 |
| Isobutanol | 20.0 | 20.0 | 20.0 |
| Dimethylethanolamine | 2.0 | 2.0 | 2.0 |
| 2,4,7,9-Tetramethyl-5-decynediol in butyl glycol (52 wt %) | 3.0 | 3.0 | 3.0 |
| Disparlon ® 6900-20X | 10.0 | — | — |
| Disparlon ® A650-20X | — | 10.0 | — |
| Disparlon ® A670-20M | — | — | 10.0 |
| Aqueous dispersion of a polyester (I) | 20.0 | 20.0 | 20.0 |
| Deionized water | 45.0 | 45.0 | 45.0 |
| Fraction of polyamide (wt % solids) | 2% | 2% | 2% |
| Fraction of organic solvents (wt %) | 33.4% | 33.4% | 33.4% |

2.6 Preparation of an Inventively Employed Dispersion of Thickener X23 and Also of a Noninventively Employed Dispersion of a Thickener Y1:

The components listed in table 1.6 below are stirred together in the stated order with stirring at a temperature of 15-25° C. in each case to form a mixture. This mixture is subsequently homogenized with stirring for a period of 10 minutes, in each case at the temperature stated above. Homogenization takes place as described above in section 2.1.

TABLE 1.6

| Preparation of a dispersion of thickener X23 and one of thickener Y1 | | |
|---|---|---|
| Components | X23 | Y1 |
| Aqueous dispersion of a polyester (I) | 10.0 | — |
| Polyester C | — | 14.5 |
| Dimethylethanolamine | 0.15 | 0.15 |
| Disparlon ® A670-20M | 5.0 | 5.0 |
| Deionized water | 15.0 | 15.0 |
| Fraction of polyamide (wt % solids) | 3% | 3% |
| Fraction of organic solvents (wt %) | 19.9% | 11.5% |

2.7 Preparation of Noninventively Employed Comparative Dispersions of Thickeners Y2 and Y3:

The components listed in table 1.7 below are stirred together in the stated order with stirring at a temperature of 15-25° C. in each case to form a mixture. This mixture is subsequently homogenized with stirring for a period of 10 minutes, in each case at the temperature stated above. Homogenization takes place as described above in section 2.1.

TABLE 1.7

| Preparation of noninventively employed comparative dispersions of thickeners Y2 and Y3: | | |
|---|---|---|
| Components | Y2 | Y3 |
| Aqueous dispersion of a polyester (I) | 22.50 | 22.50 |
| Dimethylethanolamine | 0.45 | 0.45 |
| 2,4,7,9-Tetramethyl-5-decynediol in butyl glycol (52 wt %) | 3.00 | 3.00 |
| Lipotin ® A | 3.00 | 3.00 |
| Deionized water | 56.05 | 54.35 |
| Disparlon ® A670-20M | — | — |
| Disparlon AQ600 | 15.00 | — |
| Disparlon AQ630 | — | 16.70 |
| Fraction of polyamide (wt % solids) | 3% | 3% |
| Fraction of organic solvents (wt %) | 7.0% | 7.6% |

3. Preparation of Pigment-Containing Compositions

Preparation of Pigment-Containing Compositions Used for Producing Inventive Coating Compositions and Comparative Coating Compositions Preparation of a Blue Paste P1

The blue paste P1 is prepared from 69.8 parts by weight of a polyurethane-containing dispersion prepared as per EP 0 228 003 B2, page 8, lines 6-18, 12.5 parts by weight of Paliogen® Blue L 6482 (available from BASF SE), 1.5 parts by weight of a 10% strength aqueous dimethylethanolamine solution (10 wt % in water), 1.2 parts by weight of a commercial polyether (Pluriol® P900, available from BASF SE) and 15 parts by weight of deionized water.

Preparation of a Carbon Black Paste P2

The carbon black paste P2 is prepared from 57 parts by weight of a polyurethane-containing dispersion prepared as per EP 0 228 003 B2, page 8, lines 6-18, 10 parts by weight of carbon black (Monarch® 1400 carbon black from Cabot Corporation), 5 parts by weight of the aqueous dispersion of a polyester (I), 6.5 parts by weight of a 10% strength aqueous dimethylethanolamine solution (10 wt % in water), 2.5 parts by weight of a commercial polyether (Pluriol® P900, available from BASF SE) 7 parts by weight of butyl diglycol, and 12 parts by weight of deionized water.

Preparation of a Barium Sulfate-Containing Paste P3

The barium sulfate-containing paste P3 is prepared from 39 parts by weight of a polyurethane-containing dispersion prepared as per EP 0 228 003 B2, page 8, lines 6-18, 54 parts by weight of barium sulfate (Blanc fixe micro from Sachtleben Chemie GmbH), 3.7 parts by weight of butyl glycol and 0.3 part by weight of Agitan® 282 (a commercially available defoaming agent available from Munzing Chemie GmbH), and 3 parts by weight of deionized water.

Preparation of a Talc-Containing Paste P4

The talc-containing paste P4 is prepared from 49.7 parts by weight of an aqueous binder dispersion prepared as per WO 91/15528 A1, page 23, line 26 to page 25, line 24, 28.9 parts by weight of Steatit® (Microtalc IT extra from Mondo Minerals B.V.), 0.4 part by weight of Agitan 282 (available from Münzing Chemie GmbH), 1.45 parts by weight of Disperbyk®-184 (available from BYK-Chemie GmbH), 3.1 parts by weight of a commercial polyether (Pluriol® P900, available from BASF SE), and 16.45 parts by weight of deionized water.

4. Production of Inventive Coating Compositions and Comparative Coating Compositions 4.1 General Protocol for Producing Inventive Coating Compositions and Comparative Coating Compositions:

The components listed in each case under "aqueous phase" in the tables below are stirred together in the order stated in each case to form an aqueous mixture M1. In the next step, from the components in the tables below that are listed under "organic phase", an organic mixture M2 is produced in each case. The organic M2 mixture is added to the aqueous mixture M1. This is followed by stirring for 10 minutes, and, using deionized water and dimethylethanolamine, a pH of 8 and a defined spray viscosity under a shearing load of $1000\ s^{-1}$, measured with a rotary viscometer (Rheolab QC instrument with C-LTD80/QC conditioning system, from Anton Paar) at 23° C., are set.

Where one of the tables below also includes the further heading "Mixing varnish", those components given under that heading are stirred together in the order stated in each case to start with, to prepare this mixing varnish, and are mixed over a time of 10 minutes at a temperature of 15 to 25° C., and this mixing varnish is then added to the organic mixture M2. After the resulting mixture of mixing varnish and organic mixture M2 has been stirred over a time of 10 minutes at a temperature of 15 to 25° C., the resulting mixture is then added to the aqueous mixture M1, and the subsequent procedure is as described above.

Where one of the tables below contains only the heading "aqueous phase", the components listed under that heading are stirred together in the order stated in each case to form an aqueous coating composition, and the subsequent procedure is as described above.

In the case of each of compositions V1 and B1 and also V3 and B3, B4, B5, B6, B7, and B8, and also V6 and V7 and also B13 and B14, and additionally B17, B18 and B19, and also V10 and V11, the spray viscosity set is 95±5 mPa·s. In the case of each of compositions V2 and B2 and also B15, B16 and V9, the spray viscosity set is 85±5 mPa·s. In the case of each of compositions V4 and B9, B10 and B11, the spray viscosity set is 90±5 mPa·s. In the case of each of compositions V5 and B12, the spray viscosity set is 105±5 mPa·s.

The respective quantity figures in each of the tables below, unless otherwise indicated, are in each case wt %, based on the total weight of the composition in question.

The dispersions described above in section 2. are used directly after they have been prepared for producing the inventive coating compositions and comparative coating compositions.

4.2 Coating Compositions V1 (Noninventive) and B1 (Inventive)

TABLE 2.1

| Production of V1 and B1 | | |
|---|---|---|
| | V1 | B1 |
| Aqueous phase: | | |
| Aqueous solution of an Na Mg phyllosilicate (3 wt % in deionized water) | 25.00 | — |
| Deionized water | 14.00 | 29.10 |
| Butyl glycol | 4.34 | — |
| Dispersion of thickener X4 | — | 14.50 |
| Aqueous dispersion of at least one polymeric resin (II) | 36.26 | 36.30 |
| Aqueous dispersion of a polyester (I) | 3.92 | — |
| Resimene ® HM 2608 | 5.18 | — |
| Dimethylethanolamine in water (10 wt %) | 0.77 | — |
| Organic phase: | | |
| Alu Stapa Hydrolux ® 8154 | 4.50 | 4.50 |
| Butyl glycol | 5.60 | 5.60 |
| Aqueous dispersion of a polyester (I) | 1.90 | 1.90 |
| Dimethylethanolamine in water (10 wt %) | 0.20 | 0.20 |

4.3 Coating Compositions V2 and V8 (Noninventive) and B2 (Inventive)

TABLE 2.2

| Production of V2, V8 and B2 | | | |
|---|---|---|---|
| | V2 | B2 | V8 |
| Aqueous phase: | | | |
| Aqueous solution of an Na Mg phyllosilicate (3 wt % in deionized water) | 26.70 | — | — |
| Deionized water | 7.75 | 16.48 | 29.34 |
| Butyl glycol | 5.78 | 5.78 | — |
| Dispersion of thickener X12 | — | 22.96 | — |
| Disparlon ® A670-20M | — | — | 3.44 |
| Aqueous dispersion of at least one polymeric resin (II) | 32.26 | 32.26 | — |
| Aqueous dispersion of a polyester (I) | 5.17 | — | 5.17 |
| Dimethylethanolamine in water (10 wt %) | 1.32 | 0.80 | 0.91 |
| Rheovise ® AS 1130 | 0.86 | 0.75 | — |
| 2,4,7,9-Tetramethyl-5-decynediol in butyl glycol (52 wt %) | 0.70 | — | 0.69 |
| Resimene ® HM 2608 | 4.36 | 4.36 | — |
| Pluriol ® P900 | 0.34 | 1.15 | — |
| Organic phase: | | | |
| Butyl glycol | 6.89 | 6.89 | 6.89 |
| Alu Stapa Hydrolux ® VP56450 | 5.74 | 5.74 | 5.74 |
| Mixing varnish: | | | |
| Aqueous dispersion of at least one polymeric resin (II) | 1.89 | 1.89 | 1.89 |
| Deionized water | 1.17 | 1.17 | 1.17 |
| 2,4,7,9-Tetramethyl-5-decynediol in butyl glycol (52 wt %) | 0.24 | 0.24 | 0.24 |
| Dispex ® Ultra FA 4437 | 0.10 | 0.10 | 0.10 |
| Dimethylethanolamine in water (10 wt %) | 0.01 | 0.01 | 0.01 |
| Butyl glycol | 0.60 | 0.60 | 0.60 |

4.4 Coating Compositions V3 (Noninventive) and B3, B4, B5, B6, B7, and B8 (Inventive)

TABLE 2.3

Production of V3 and B3, B4, B5, B6, B7 and B8

| | V3 | B3 | B4 | B5 | B6 | B7 | B8 |
|---|---|---|---|---|---|---|---|
| Aqueous phase: | | | | | | | |
| Aqueous solution of an Na Mg phyllosilicate (3 wt % in deionized water) | 24.35 | — | — | — | — | — | — |
| Deionized water | 13.00 | 21.50 | 23.50 | 32.00 | 26.00 | 27.00 | — |
| n-Butoxypropanol | 1.65 | — | — | — | — | — | 1.65 |
| 1-Propoxy-2-propanol | 2.20 | — | — | — | — | — | 2.20 |
| 2-Ethylhexanol | 2.50 | 2.50 | 2.50 | 2.50 | 2.50 | 2.50 | 2.50 |
| Dispersion of thickener X5 | — | 14.70 | — | — | — | — | — |
| Dispersion of thickener X6 | — | — | 15.70 | — | — | — | — |
| Dispersion of thickener X7 | — | — | — | 16.20 | — | — | — |
| Dispersion of thickener X8 | — | — | — | — | 16.70 | — | — |
| Dispersion of thickener X9 | — | — | — | — | — | 17.70 | — |
| Dispersion of thickener X13 | — | — | — | — | — | — | 22.88 |
| Aqueous dispersion of at least one polymeric resin (II) | 26.00 | 26.00 | 26.00 | 26.00 | 26.00 | 26.00 | 26.00 |
| Aqueous dispersion of a polyester (I) | 2.60 | — | — | — | — | — | — |
| Dimethylethanolamine in water (10 wt %) | 0.50 | 0.50 | 1.00 | 1.00 | 1.00 | 1.00 | — |
| Deionized water | 4.05 | 4.05 | 4.05 | 4.05 | 4.05 | 4.05 | 4.05 |
| Rheovis ® AS 1130 | 0.65 | 0.65 | 0.65 | 0.65 | 0.65 | 0.65 | 0.65 |
| Resimene ® HM 2608 | 3.80 | — | — | — | — | — | 3.80 |
| Pluriol ® P900 | 1.00 | 1.00 | 1.00 | 1.00 | 1.00 | 1.00 | 1.00 |
| Byketol ®-WS | 1.00 | 1.00 | 1.00 | 1.00 | 1.00 | 1.00 | 1.00 |
| Aqueous dispersion of at least one polymeric resin (I) | 3.80 | 3.80 | 3.80 | 3.80 | 3.80 | 3.80 | 3.80 |
| Isobutanol | 2.40 | — | — | — | — | — | — |
| Rheovis ® PU 1250 | 0.80 | 0.80 | 0.80 | 0.80 | 0.80 | 0.80 | 0.80 |
| Organic phase: | | | | | | | |
| Mixture of Alu Stapa Hydrolux ® 2154 & VP56450 | 4.50 | 4.50 | 4.50 | 4.50 | 4.50 | 4.50 | 4.50 |
| Butyl glycol | 5.60 | 5.60 | 5.60 | 5.60 | 5.60 | 5.60 | 5.60 |
| Aqueous dispersion of a polyester (I) | 1.90 | 1.90 | 1.90 | 1.90 | 1.90 | 1.90 | 1.90 |
| Dimethylethanolamine in water (10 wt %) | 0.20 | 0.20 | 0.20 | 0.20 | 0.20 | 0.20 | 0.20 |

4.5 Coating Compositions V4 (Noninventive) and B9, B10, and B11 (Inventive)

TABLE 2.4

Production of V4 and B9, B10 and B11

| | V4 | B9 | B10 | B11 |
|---|---|---|---|---|
| Aqueous phase: | | | | |
| Aqueous solution of an Na Mg phyllosilicate (3 wt % in deionized water) | 25.00 | — | — | — |
| Deionized water | 15.30 | 8.00 | 10.00 | 7.50 |
| Butyl glycol | 3.20 | 2.00 | 2.00 | 2.00 |
| Dispersion of thickener X1 | — | 35.00 | — | — |
| Dispersion of thickener X2 | — | — | 35.00 | — |
| Dispersion of thickener X3 | — | — | — | 35.00 |

TABLE 2.4-continued

Production of V4 and B9, B10 and B11

| | V4 | B9 | B10 | B11 |
|---|---|---|---|---|
| Aqueous dispersion of at least one polymeric resin (II) | 32.90 | 32.90 | 32.90 | 32.90 |
| Aqueous dispersion of a polyester (I) | 7.00 | — | — | — |
| Dimethylethanolamine in water (10 wt %) | 1.20 | 0.50 | 0.50 | 0.50 |
| Resimene ® HM 2608 | 5.20 | 5.20 | 5.20 | 5.20 |
| Organic phase: | | | | |
| Alu Stapa Hydrolux ® 8154 | 7.20 | 7.20 | 7.20 | 7.20 |
| Butyl glycol | 8.80 | 10.00 | 10.00 | 10.00 |

TABLE 2.4-continued

Production of V4 and B9, B10 and B11

|  | V4 | B9 | B10 | B11 |
|---|---|---|---|---|
| Mixing varnish: | | | | |
| Aqueous dispersion of at least one polymeric resin (II) | 3.38 | 3.38 | 3.38 | 3.38 |
| Deionized water | 2.10 | 2.10 | 2.10 | 2.10 |
| 2,4,7,9-Tetramethyl-5-decynediol in butyl glycol (52 wt %) | 0.43 | 0.43 | 0.43 | 0.43 |
| Dispex ® Ultra FA 4437 | 0.18 | 0.18 | 0.18 | 0.18 |
| Dimethylethanolamine in water (10 wt %) | 0.02 | 0.02 | 0.02 | 0.02 |
| Butyl glycol | 1.08 | 1.08 | 1.08 | 1.08 |

4.6 Coating Compositions V5 (not Inventive) and B12 (Inventive)

TABLE 2.5

Production of V5 and B12

|  | V5 | B12 |
|---|---|---|
| Aqueous phase: | | |
| Aqueous solution of an Na Mg phyllosilicate (3 wt % in deionized water) | 13.10 | — |
| Deionized water | 10.53 | 17.60 |
| n-Propanol | 0.87 | 0.87 |
| n-Butoxypropanol | 1.38 | 1.38 |
| 2-Ethylhexanol | 2.77 | 2.77 |
| Dispersion of thickener X10 | — | 17.42 |
| Aqueous dispersion of at least one polymeric resin (II) | 35.24 | 35.24 |
| Aqueous dispersion of a polyester (1) | 2.95 | — |
| Resimene ® HM 2608 | 4.10 | — |
| Dimethylethanolamine in water (10 wt %) | 0.30 | — |
| 2,4,7,9-Tetramethyl-5-decynediol in butyl glycol (52 wt %) | 1.38 | 1.38 |
| BYK ®-346 | 0.46 | 0.46 |
| Aqueous dispersion of at least one polymeric resin (II) | 2.77 | — |
| Isopropanol | 1.64 | 1.64 |
| Butyl glycol | 1.00 | 1.00 |
| Isopar ® L | 0.87 | 0.87 |
| Nacure ® 2500 | 0.42 | 0.42 |
| Carbon black paste P2 | 12.99 | 12.99 |
| Blue paste P1 | 0.78 | 0.78 |
| Barium sulfate-containing paste P3 | 3.21 | 3.21 |
| Talc-containing paste P4 | 3.25 | 3.25 |

4.7 Coating Compositions V6 and V7 (Noninventive) and B13 and B14 (Inventive)

TABLE 2.6

Production of V6 and V7 and also of B13 and B14

|  | V6 | V7 | B13 | 214 |
|---|---|---|---|---|
| Aqueous phase: | | | | |
| Aqueous solution of an Na Mg phyllosilicate (3 wt % in deionized water) | 24.35 | 24.35 | — | — |
| Deionized water | 6.00 | 2.50 | 25.50 | 12.50 |
| n-Butoxypropanol | 1.65 | 1.65 | — | — |
| 1-Propoxy-2-propanol | 2.20 | 2.20 | — | — |
| 2-Ethylhexanol | 2.50 | 2.50 | 2.50 | 2.50 |
| Dispersion of thickener X11 | — | — | 15.75 | 15.75 |
| Aqueous dispersion of at least one polymeric resin (III) | 26.00 | — | 26.00 | — |
| Aqueous dispersion of at least one polymeric resin (II) | — | 26.00 | — | 26.00 |
| Aqueous dispersion of a polyester (I) | 2.60 | 2.60 | — | — |
| Deionized water | 4.05 | 4.05 | 4.05 | 4.05 |
| Rheovis ® AS 1130 | 0.20 | 0.65 | 0.40 | 0.80 |
| Resimene ® HM 2608 | 3.80 | 3.80 | — | — |
| Dimethylethanolamine in water (10 wt %) | 0.90 | 0.50 | 1.00 | 0.20 |
| Pluriol ® P900 | 0.30 | 0.30 | 1.00 | 1.00 |
| Byketol ®-WS | 1.00 | 1.00 | 1.00 | 1.00 |
| Aqueous dispersion of at least one polymeric resin (I) | 3.80 | 3.80 | 3.80 | 3.80 |
| Isobutanol | 2.40 | 2.40 | — | — |
| Rheovis ® PU 1250 | 0.80 | 0.80 | 0.80 | 0.80 |
| Deionized water | 10.00 | 10.00 | 15.00 | 15.00 |
| Organic phase: | | | | |
| Mixture of Alu Stapa Hydrolux ® 2154 & VP56450 | 4.50 | 4.50 | 4.50 | 4.50 |
| Butyl glycol | 5.60 | 5.60 | 5.60 | 5.60 |
| Aqueous dispersion of a polyester (I) | 1.90 | 1.90 | 1.90 | 1.90 |
| Dimethylethanolamine in water (10 wt %) | 0.20 | 0.20 | 0.20 | 0.20 |

4.8 Coating Compositions V9 (Noninventive) and B15 and B16 (Inventive)

TABLE 2.7

Production of B15, B16 and of V9

|  | B15 | B16 | V9 |
|---|---|---|---|
| Aqueous phase | | | |
| Deionized water | 17.40 | 17.40 | 30.35 |
| n-Butoxypropanol | 1.90 | 1.90 | 1.90 |
| 2-Ethylhexanol | 1.70 | 1.70 | 1.70 |
| Dispersion of thickener X18 | 23.10 | — | — |
| Dispersion of thickener X19 | — | 23.10 | — |
| Disparlon ® A670-20M | — | — | 3.47 |
| Aqueous dispersion of at least one polymeric resin (II) | 24.25 | 24.25 | 24.25 |
| Aqueous dispersion of a polyester (I) | — | — | 5.20 |
| 1-Propoxy-2-propanol | 2.55 | 2.55 | 2.55 |
| Butyl glycol | 0.70 | 0.70 | 0.70 |
| Dimethylethanolamine in water (10 wt %) | 0.70 | 0.70 | 0.80 |
| Rheovis ® AS 1130 | 0.90 | 0.90 | 0.90 |
| Resimene ® HM 2608 | 4.40 | 4.40 | 4.40 |
| Pluriol ® P900 | 1.15 | 1.15 | 1.15 |
| Aqueous dispersion of at least one polymeric resin (II) | 3.45 | 3.45 | 3.45 |
| Organic phase | | | |
| Alu Stapa Hydrolux ® VP56450 | 5.8 | 5.8 | 5.8 |
| Butyl glycol | 6.2 | 6.2 | 6.2 |
| Aqueous dispersion of at least one polymeric resin (II) | 5.8 | 5.8 | 5.8 |

4.9 Coating Compositions B17 to B19 (Inventive) and Also V10 and V11 (Noninventive)

TABLE 2.8

Production of B17, B18 and B19 and also V10 and V11

|  | B17 | B18 | B19 | V10 | V11 |
|---|---|---|---|---|---|
| Aqueous phase | | | | | |
| Deionized water | 12.50 | 12.50 | 12.50 | 12.50 | 12.50 |
| Butyl glycol | 4.34 | 4.34 | 4.34 | 4.34 | 4.34 |
| Dispersion of thickener X20 | 35.00 | — | — | — | — |
| Dispersion of thickener X21 | — | 35.00 | — | — | — |
| Dispersion of thickener X22 | — | — | 35.00 | — | — |
| Aqueous polyamide dispersion I | — | — | — | — | 7.00 |
| Aqueous polyamide dispersion II | — | — | — | 17.50 | — |
| Aqueous dispersion of at least one polymeric resin (II) | 36.26 | 36.26 | 36.26 | 36.26 | 36.26 |
| Aqueous dispersion of a polyester (I) | 3.92 | 3.92 | 3.92 | 3.92 | 3.92 |
| Dimethylethanolamine in water (10 wt %) | 1.19 | 1.19 | 1.19 | 1.19 | 1.19 |
| Resimene ® HM 2608 | 5.18 | 5.18 | 5.18 | 5.18 | 5.18 |
| Organic phase | | | | | |
| Alu Stapa Hydrolux ® 8154 | 7.28 | 7.28 | 7.28 | 7.28 | 7.28 |
| Butyl glycol | 8.75 | 8.75 | 8.75 | 8.75 | 8.75 |
| Aqueous dispersion of at least one polymeric resin (II) | 3.08 | 3.08 | 3.08 | 3.08 | 3.08 |

The respective quantity figures in table 2.8 represent parts by weight in each case.

5. Tests and Investigations 5.1 Investigations into the Incidence of Runs

This investigation takes place according to the method described above. The inventive coating composition B1 or B9 or the comparative coating composition V1 or V4 as waterborne basecoat material is applied here to a perforated metal panel coated as described within the method of determination. This is followed, as described within the method, by the application of a clearcoat material to the respective basecoat films obtained accordingly.

The results are summarized in table 3.1a and table 3.1b.

TABLE 3.1a

Results of the investigations into the incidence of runs

|  | V1 | B1 |
|---|---|---|
| Running limit [film thickness in µm] | 30 | >40 |

TABLE 3.1b

Results of the investigations into the incidence of runs

|  | V4 | B9 |
|---|---|---|
| Running limit [film thickness in µm] | 18 | >30 |

The results shows that the inventive coating composition B1 in comparison to V1 has a substantially higher running limit, i.e., a significant improvement in the propensity to run. A similar picture arises on a comparison of B9 with V4.

5.2 Investigations into the Cloudiness

This investigation takes place according to the method described above. The inventive coating composition B2 and also the comparative coating composition V2 as waterborne basecoat material are applied here to a steel metal panel coated as described within the method of determination. This is followed, as described within the method, by the application of a clearcoat material to the respective basecoat films obtained accordingly.

The results are summarized in table 3.2.

TABLE 3.2

Results of the investigations into cloudiness

|  | V2 | B2 |
|---|---|---|
| Clouds viewed straight on (80°) | 4 | 2 |
| Clouds viewed obliquely (40°) | 4 | 3 |

The results show that the inventive coating composition B2 in comparison to V2 has a substantially lower cloudiness.

5.3 Investigations into the Incidence of Pops

This investigation takes place according to the method described above. The inventive coating composition B3, B4, B6, B7 or B8 or the comparative coating composition V3 as waterborne basecoat material is applied here to a perforated metal panel coated as described within the method of determination. This is followed, as described within the method, by the application of a clearcoat material to the respective basecoat films obtained accordingly.

The results are summarized in table 3.3.

TABLE 3.3

Results of the investigations into the incidence of pops

|  | V3 | B3 | B4 | B6 | B7 | B8 |
|---|---|---|---|---|---|---|
| Popping limit [film thickness in µm]: | 30 | >40 | >35 | >35 | >40 | >85 |

The inventive coating compositions B3, B4, B6, B7, and B8 all show an outstanding popping level and advantages over the comparative coating composition V3, i.e., the inventive coating compositions B3, B4, B6, B7, and B8 as waterborne basecoat material can be applied in substantially higher film thicknesses than V3 without pops occurring.

5.4 Investigations into the Leveling after Condensation Water Treatment

This investigation takes place according to the method described above. The inventive coating composition B9, B10 or B11 or comparative coating composition V4 as waterborne basecoat material is applied here in each case to a steel metal panel coated as described within the method of determination. This is followed, as described within the method, by the application of a clearcoat material to the respective basecoat films obtained accordingly.

The results are summarized in table 3.4.

TABLE 3.4

Results of the investigations into leveling after condensation water treatment

|  | V4 | B9 | B10 | B11 |
|---|---|---|---|---|
| Before condensation water exposure | | | | |
| Longwave (LW): | 1.7 | 1.6 | 1.5 | 1.7 |
| Shortwave (SW): | 14.8 | 12.8 | 10.8 | 13.8 |
| DOI: | 86.2 | 87.6 | 88 | 87.2 |
| After condensation water exposure | | | | |
| Longwave (LW): | 4.7 | 1.8 | 1.4 | 1.5 |
| Shortwave (SW): | 30.6 | 11.8 | 10.1 | 12.1 |
| DOI: | 82.1 | 88.2 | 88.6 | 88.2 |
| Swelling: | slight swelling | OK | OK | OK |

OK = satisfactory

The results show that the inventive coating compositions B9, B10 and B11 in comparison to V4 have advantages both before and after condensation water exposure, showing that incipient swelling of the multiple-coat system comprising a basecoat film obtained respectively from one of these compositions, as reflected in high LW and/or SW values, does not occur.

5.5 Investigations into the Stonechip Adhesion

This investigation takes place in accordance with the method described above. The inventive coating composition B9, B10 or B11 or comparative coating composition V4 as waterborne basecoat material is applied here in each case to a steel panel coated as described within the method of determination. This is followed, as described within the method, by the application of a clearcoat material to the respective basecoat films obtained accordingly.

For all of the substrates investigated, a characteristic value of 1 as per the DIN specification stated within the method of determination was found.

In comparison to conventional phyllosilicates used as thickeners, such as Na Mg phyllosilicates, the use of the inventively employed thickeners does not, therefore, have any adverse consequences for the stonechip adhesion.

5.6 Investigations into the Film Thickness-Dependent Leveling

This investigation takes place in accordance with the method described above in a wedge construction. The inventive coating composition B12 or the comparative coating composition V5 as waterborne basecoat material is applied here in each case to a steel panel coated as described within the method of determination. This is followed, as described within the method, by the application of a clearcoat material to the respective basecoat films obtained accordingly.

The results are summarized in table 3.5.

TABLE 3.5

Results of the investigations into film thickness-dependent leveling

| | Film thickness range | V5 | B12 |
|---|---|---|---|
| Longwave (LW): | 10-15 μm | 2.7 | 2.5 |
| | 15-20 μm | 2.4 | 2.4 |

TABLE 3.5-continued

Results of the investigations into film thickness-dependent leveling

| | Film thickness range | V5 | B12 |
|---|---|---|---|
| | 20-25 μm | 2.6 | 2.2 |
| | 25-30 μm | 2.7 | 2.2 |
| Shortwave (SW): | 10-15 μm | 12.8 | 10.1 |
| | 15-20 μm | 12.9 | 9.2 |
| | 20-25 μm | 12.1 | 9.8 |
| | 25-30 μm | 12 | 10.4 |
| DOI | 10-15 μm | 94.4 | 95.4 |
| | 15-20 μm | 94.4 | 96.2 |
| | 20-25 μm | 94.7 | 95.8 |
| | 25-30 μm | 94.8 | 95.3 |

In comparison to V5, in a wedge construction, the inventive coating composition B12 exhibits advantages in terms of appearance, especially with regard to SW and DOI, in all film thickness ranges, these advantages being not only evident from measurement but also clear to the eye.

5.7 Investigations into the Application Efficiency

This investigation takes place in accordance with the method described above. The inventive coating composition B13 or B14 or the comparative coating composition V6 or V7 as waterborne basecoat material is applied here in each case to a metal panel coated as described within the method of determination.

The results are summarized in table 3.6.

TABLE 3.6

| | V6 | V7 | B13 | B14 |
|---|---|---|---|---|
| Solids content (to DIN EN ISO 3251) | 9.6 | 18.8 | 18.3 | 19.3 |
| Volume solids content (to DIN 53219) | 17.7 | 17.2 | 17.1 | 18.4 |
| Area integral [10$^4$ μm$^2$] | 223 | 205 | 278 | 264 |

The area integral of the curve, which represents the average film thickness profile of a spray pattern application in accordance with the spray pattern application described within the method, is significantly greater for the inventive coating compositions B13 and B14 than for V6 and V7. This integral can be interpreted as a characteristic value for the amount of coating material deposited at constant coating parameters, and hence for the application efficiency. In spite of a respectively higher solids content and volume solids content, a smaller area integral is obtained for V6 in comparison to B13, and hence a lower application efficiency. The slightly higher solids and volume solids contents of the inventive coating composition B14 does not explain the significantly higher area integral in comparison to formulation V7, and so as well here the comparatively higher area integral and hence a higher application efficiency are surprising. Application of V7 in comparison to B14 in analogy to the method described above for determining the cloudiness, moreover, leads to reproducibly higher dry film thicknesses for B14, of around 4-5 μm, in comparison to V7, which likewise cannot be based on the differences present in solids and volume solids contents. The respective film thicknesses here are determined according to DIN EN ISO 2808 method 12A (Date: May 2007) (using the Elektro-Physik MiniTest® 3100-4100 instrument).

5.8 Investigations into the Incidence of Pinholes and Bits

These investigations are made in accordance with the methods described above.

The results are summarized in tables 3.7 and 3.8.

TABLE 3.7

| Results of the investigations into the incidence of pinholes | | | |
|---|---|---|---|
| Film thickness range Clearcoat wedge | B15 | B16 | V9 |
| 20-30 μm | 0 | 0 | n.m. |
| 30-40 μm | 0 | 0 | n.m. |
| 40-50 μm | 0 | 0 | n.m. |
| Total | 0 | 0 | n.m. | n.m. = not measurable

TABLE 3.8

| Results of the investigations into the incidence of bits | | | |
|---|---|---|---|
| | B15 | B16 | V9 |
| Bits | 1 | 1 | 5 |

As is apparent from table 3.7, the presence of inventive dispersions X18 and X19 as a component in the aqueous basecoat materials B15 and B16 results in excellent pinhole robustness: no pinholes could be observed. As can be seen from table 3.8, moreover, no bittiness at all was observable in the case of B15 and B16. In contrast, a large number of bits were observed in the case of comparative basecoat material V9: the aqueous comparative basecoat material V9 contains the individual components used for preparing the inventively employed dispersions, i.e., a polyester (aqueous dispersion of the polyester (I)) and a polyamide (Disparlon® A670-20M), but these components had not been processed beforehand into a corresponding dispersion, but were instead incorporated directly, as separate components, into the comparative basecoat material V9. In the case of V9, moreover, separation can be seen after just a few hours of storage at 18-23° C. Because of this, an evaluation of the pinhole test in the case of V9 is not possible.

5.9 Investigations into the Incidence of Bits and the Storage Stability

These investigations take place in accordance with the methods described above.

The results are summarized in tables 3.9 and 3.10.

TABLE 3.9

| Results of the investigations into the incidence of bits | | | |
|---|---|---|---|
| | V2 | B2 | V8 |
| Bits | 1 | 1 | 5 |

Table 3.10: Results of the Investigations into Storage Stability

TABLE 3.10

| Result of the investigations into storage stability | | | | |
|---|---|---|---|---|
| | | V2 | B2 | V8 |
| Low-shear viscosity (1 s$^{-1}$) in mPa · s | Directly after preparation | 3013 | 3053 | n.m. |
| | After 2 weeks' storage at 40° C. | 3819 | 3177 | n.m. |
| | Change [%] | 27% | 4% | |
| High-shear viscosity (1000 s$^{-1}$) in mPa · s | Directly after preparation | 78 | 79 | n.m. |
| | After 2 weeks' storage at 40° C. | 87 | 85 | n.m. |
| | Change [%] | 11% | 6% | | n.m. = not measurable

As can be seen from table 3.9, no bittiness at all was observable in the case of B2 and V2 (containing an Na Mg phyllosilicate as thickener). In contrast, a large number of bits were observed in the case of comparative basecoat material V8: the aqueous comparative basecoat material V9 contains the individual components used for preparing the inventively employed dispersions, i.e., a polyester (aqueous dispersion of the polyester (I)) and a polyamide (Disparlon® A670-20M), but these components had not been processed beforehand into an inventively employed dispersion, but were instead incorporated directly, as separate components, into the comparative basecoat material V8. In the case of V8, moreover, (phase) separation can be seen after just a few hours of storage at 40° C. Because of this, a determination of the low-shear and high-shear viscosities in the case of V8 is not possible. The waterborne basecoat materials V2 and B2 in contrast, are stable on storage at 40° C. and exhibit an acceptable shift in the high-shear and low-shear viscosity after 2 weeks of storage at 40° C., with the inventive waterborne basecoat material B2 having significant advantages over V2 (smaller changes) (cf. table 3.10).

5.10 Investigations into the Incidence of Bits

This investigation takes place in accordance with the method described above.

The results are summarized in table 3.11.

TABLE 3.11

| Results of the investigations into the incidence of bits | | | | | |
|---|---|---|---|---|---|
| | B17 | B18 | B19 | V10 | V11 |
| Bits after 3 days' storage after preparation at 18-23° C. | 1 | 1 | 1 | 5 | 5 |

As can be seen from table 3.11, the use of polyamides commonly used in aqueous compositions, with a high acid number, as thickeners in coating compositions (V10 and V11), such as the commercially available products Disparlon® AQ600 and AQ630, has disadvantages in terms of the incidence of bits, which cannot be observed in the case of the inventive coating compositions (B17 to B19).

5.11 Investigations into the Incidence of Bits, the Homogeneity, and the Water-Miscibility of Inventively Employed Dispersions and Comparative Dispersions These investigations take place in accordance with the methods described above.

The results are summarized in table 3.12.

TABLE 3.12

|  | Y1 | X23 |
|---|---|---|
| Homogeneity | 5 | 1 |
| Water-miscibility | 5 | 1 |
| Bittiness | 5 | 1 |

From table 3.12 it can be seen that with Y1 in contrast to X23 it is possible to achieve neither good homogeneity nor good water-miscibility. For determining the water-miscibility, Y1 and X23 are each prepared by mixing of the components stated in table 1.6 in the order specified therein, and in accordance with the description of the method for determining the water-miscibility, the amount of deionized water indicated in table 1.6 in each case is used only as a final component in the preparation Y1 and X23. Moreover, a large number of bits occurring were observable in the case of Y1. In contrast to X23, the polyester component of Y1 is a polyester which was not obtained by reaction of at least one polymerized aliphatic $C_{12}$-$C_{24}$ monocarboxylic acid with at least one diol and/or polyol: these results show that it is essential to the invention that the inventively employed polyester is obtainable by such a reaction with participation of a polymerized aliphatic $C_{12}$-$C_{24}$ monocarboxylic acid.

5.12 Investigations into the Incidence of Bits and the Homogeneity of Inventively Employed Dispersions and Comparative Dispersions The inventively employed dispersion of thickener X12 and also the comparative dispersions Y2 and Y3 are investigated and assessed in accordance with the methods described above with regard to the incidence of bits and the homogeneity.

The results are summarized in table 3.13.

TABLE 3.13

|  | X12 | Y2 | Y3 |
|---|---|---|---|
| Homogeneity | 1 | 1 | 1 |
| Bittiness |  |  |  |
| after preparation | 1 | 3-4 | 3-4 |
| after 14 days at 40° C. | 1 | 3-4 | 3-4 |

From table 3.13 it can be seen that with Y2 and Y3 it is indeed possible, as with X12, to achieve good homogeneity, but that in the case of Y2 and Y3, in contrast to X12, the incidence of a large number of bits is observed, after preparation and also after storage. The polyamides in Y2 and Y3 are polyamides of high acid number that are customarily used in aqueous compositions, specifically the commercially available products Disparlon® AQ600 (Y2) and AQ630 (Y3). This disadvantage is not observed in the case of X12.

What is claimed is:

1. An aqueous coating composition, comprising:
    at least one mixture (M) of at least one polymeric resin (P1) and at least one polymeric resin (P2), different from (P1), wherein
    the polymeric resin (P1) is a polyamide, and
    the polymeric resin (P2) is a polyester which is at least obtainable by reaction of at least one polymerized aliphatic $C_{12}$-$C_{24}$-monocarboxylic acid with at least one diol and/or polyol,
    at least one binder (A) comprising at least one polymeric resin (A1), which is different from the polymeric resins (P1) and (P2), and optionally at least one crosslinking agent (A2), and
    at least one pigment (B),
    wherein the polyamide used as polymeric resin (P1) has an acid number <10 mg of KOH per g of polyamide and the mixture (M) is obtainable by dispersing of the polymeric resin (P1) in water or an aqueous medium in the presence of the polymeric resin (P2).

2. The coating composition as claimed in claim 1, wherein the polyamide used as polymeric resin (P1) has an acid number in a range from 0.01 to 8.0 mg of KOH per g of polyamide.

3. The coating composition as claimed in claim 1, wherein the relative weight ratio of the polymeric resins (P2) and (P1) to one another, based in each case on their solids content, in the coating composition is in a range from 10:1 to 1.5:1.

4. The coating composition as claimed in claim 1, wherein the coating composition is obtainable by the steps (1) and (2), succeeding one another in this order, specifically
    (1) dispersing the polymeric resin (P1) in water or an aqueous medium in the presence of the polymeric resin (P2), to give an aqueous dispersion of the mixture (M), and
    (2) mixing the aqueous dispersion of the mixture (M) obtained by step (1) with the further components used for preparing the coating composition.

5. The coating composition as claimed in claim 1, wherein the mixture (M) of the at least one polymeric resin (P1) and the at least one polymeric resin (P2), different from (P1), is present in the coating composition in an amount in a range from 0.5 to 15 wt %, based on the total weight of the coating composition.

6. The coating composition as claimed in claim 1, which comprises the polyamide used as polymeric resin (P1) in an amount in a range from 0.05 to 5 wt %, based on the total weight of the coating composition.

7. The coating composition as claimed in claim 1, wherein the polyester used as polymeric resin (P2) has an acid number in a range from 20 to 50 mg of KOH per g of polyester and/or a hydroxyl number in a range from 20 to 300 mg of KOH per g of polyester.

8. The coating composition as claimed in claim 1, wherein the polyester used as polymeric resin (P2) is at least obtainable by reaction of at least one dimerized and/or trimerized aliphatic $C_{12}$-$C_{24}$ monocarboxylic acid with at least one aliphatic $C_2$-$C_{20}$ polyol and/or $C_2$-$C_{20}$ diol.

9. The coating composition as claimed in claim 1, wherein to prepare the polyester used as polymeric resin (P2) use is made additionally of at least one dicarboxylic acid and/or at least one tricarboxylic acid selected from the group consisting of aliphatic $C_3$-$C_{12}$ dicarboxylic acids, cycloaliphatic $C_5$-$C_{12}$ dicarboxylic acids, aromatic $C_8$-$C_{12}$ dicarboxylic acids, aliphatic $C_5$-$C_{12}$ tricarboxylic acids, cycloaliphatic $C_6$-$C_{12}$ tricarboxylic acids, and aromatic $C_9$-$C_{12}$ tricarboxylic acids, and optionally at least one aliphatic $C_{12}$-$C_{24}$ monocarboxylic acid.

10. The coating composition as claimed in claim 1, wherein the binder (A) comprises at least one polyurethane and/or at least one poly(meth)acrylate and/or at least one polyester as at least one polymeric resin (A1).

11. The coating composition as claimed in claim 1, which comprises the polymeric resin (A1) in an amount in a range from 5 to 40 wt %, based on the total weight of the coating composition, and the pigment (B) in an amount in a range from 0.1 to 25 wt %, based on the total weight of the coating composition.

12. An aqueous coating composition, comprising:
   a rheological assistant which is a mixture (M) of at least one polymeric resin (P1) and at least one polymeric resin (P2), different therefrom, wherein
   the polymeric resin (P1) is a polyamide which has an acid number <10 mg of KOH per g of polyamide, and
   the polymeric resin (P2) is a polyester which is at least obtainable by reaction of at least one polymerized aliphatic $C_{12}$-$C_{24}$ monocarboxylic acid with at least one diol and/or polyol.

13. A substrate coated at least partly with the aqueous coating composition as claimed in claim 1.

14. A method for at least partly coating an optionally coated substrate with a basecoat film, comprising:
   (a) at least partly coating at least one optionally coated substrate with a basecoat film by the aqueous coating composition as claimed in claim 1.

15. A basecoat film which is obtainable by the method as claimed in claim 14.

16. A substrate coated at least partly with the basecoat film as claimed in claim 15.

* * * * *

UNITED STATES PATENT AND TRADEMARK OFFICE
CERTIFICATE OF CORRECTION

PATENT NO. : 10,160,871 B2
APPLICATION NO. : 15/505449
DATED : December 25, 2018
INVENTOR(S) : Cathrin Corten et al.

Page 1 of 1

It is certified that error appears in the above-identified patent and that said Letters Patent is hereby corrected as shown below:

In the Specification

Column 5, Line 30, "VWA-Getzmann," should read --VMA-Getzmann,--.

Column 11, Line 11, "elostearic" should read --eleostearic--.

Column 17, Line 2, "uretidiones" should read --uretdiones--.

Column 26, Line 32, "ElekroPhysik" should read --ElektroPhysik--.

Column 28, Line 2, "ElekroPhysik" should read --ElektroPhysik--.

Column 30, Line 27, "ElectroPhysik" should read --ElektroPhysik--.

Column 34, Line 31, "VWA-Getzmann," should read --VMA-Getzmann,--.

Column 40, TABLE 2.2, under Aqueous phase: Line 50, "Rheovise ®" should read --Rheovise®--.

Signed and Sealed this
Twenty-eighth Day of January, 2020

Andrei Iancu
*Director of the United States Patent and Trademark Office*